United States Patent
Matsuoka

(10) Patent No.: US 11,373,032 B2
(45) Date of Patent: Jun. 28, 2022

(54) INFORMATION PROCESSING APPARATUS AND NON-TRANSITORY COMPUTER READABLE MEDIUM RELATED TO TOOL BOX

(71) Applicant: FUJIFILM Business Innovation Corp., Tokyo (JP)

(72) Inventor: Daiki Matsuoka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 139 days.

(21) Appl. No.: 16/554,585

(22) Filed: Aug. 28, 2019

(65) Prior Publication Data

US 2020/0302007 A1 Sep. 24, 2020

(30) Foreign Application Priority Data

Mar. 20, 2019 (JP) .............................. JP2019-053817

(51) Int. Cl.
*G06F 3/0484* (2022.01)
*G06F 40/169* (2020.01)
*G06F 3/0482* (2013.01)
*G06F 3/04847* (2022.01)
*G06F 3/04842* (2022.01)
*G06F 40/117* (2020.01)

(52) U.S. Cl.
CPC .......... *G06F 40/169* (2020.01); *G06F 3/0482* (2013.01); *G06F 3/04842* (2013.01); *G06F 3/04847* (2013.01); *G06F 40/117* (2020.01)

(58) Field of Classification Search
CPC .... G06F 40/169; G06F 40/117; G06F 3/0482; G06F 3/04847; G06F 3/04842; G06F 3/0481; G06F 3/04812; G06F 3/04895; H04M 1/2477; H04N 1/00408; H04N 1/00437
See application file for complete search history.

(56) References Cited

U.S. PATENT DOCUMENTS

| | | | |
|---|---|---|---|
| 9,652,109 B2 | 5/2017 | Borzello et al. | |
| 2012/0050158 A1* | 3/2012 | Ahn | G06F 3/038 345/157 |
| 2014/0040742 A1* | 2/2014 | Park | G06F 3/04886 715/719 |
| 2014/0157200 A1* | 6/2014 | Jeon | G06F 3/0482 715/834 |

(Continued)

FOREIGN PATENT DOCUMENTS

| | | |
|---|---|---|
| JP | H10-11040 | 1/1998 |
| JP | H10-91384 | 4/1998 |
| JP | 2016-503218 | 2/2016 |

*Primary Examiner* — Phuong H Nguyen
(74) *Attorney, Agent, or Firm* — JCIPRNET

(57) ABSTRACT

An information processing apparatus includes: a first display control section that performs control so as to display a display area that includes data to be edited; a detection section that detects a position designated by a user in the display area; a second display control section that performs control so as to display a tool box, in which plural tools are registered, through an identical operation; and a third display control section that performs control, in a case where the tool box is to be displayed, so as to display the tool box with a different content in accordance with the position detected by the detection section.

12 Claims, 19 Drawing Sheets

(56) References Cited

U.S. PATENT DOCUMENTS

2014/0201672 A1* 7/2014 Borzello ............... G06F 3/0482
  715/779
2015/0012884 A1* 1/2015 Hayasaka ............. G06F 3/0482
  715/811
2017/0220567 A1* 8/2017 Masson ................ G06F 40/274

* cited by examiner

FIG. 18

| OPERATION | CLICK | | TOOL USED BY USER | |
| --- | --- | --- | --- | --- |
| | POSITION | PREVIOUS OPERATION | INSIDE TOOL BOX | OUTSIDE TOOL BOX |
| OPERATION 1 | END PORTION | NONE | NONE | DATE MARK |
| OPERATION 2 | END PORTION | NONE | BLUE STICKY NOTE | NONE |
| OPERATION 3 | ON CHARACTER STRING | CHARACTER STRING IS SELECTED | MARKER | NONE |
| OPERATION 4 | CENTER | DRAG | ROUND | NONE |
| OPERATION 5 | END PORTION | NONE | GREEN STICKY NOTE | NONE |
| OPERATION 6 | END PORTION | NONE | NONE | DATE MARK |
| OPERATION 7 | CENTER | DRAG | RECTANGULAR | NONE |

INFORMATION PROCESSING APPARATUS AND NON-TRANSITORY COMPUTER READABLE MEDIUM RELATED TO TOOL BOX

CROSS-REFERENCE TO RELATED APPLICATIONS

This application is based on and claims priority under 35 USC 119 from Japanese Patent Application No. 2019-053817 filed Mar. 20, 2019.

BACKGROUND

(i) Technical Field

The present disclosure relates to an information processing apparatus and a non-transitory computer readable medium.

(ii) Related Art

Japanese Unexamined Patent Application Publication No. 10-11040, for example, describes a figure editing device that allows a figure, a symbol, a character, etc. composed of a plurality of objects to be prepared and edited on a display. The figure editing device includes an icon display unit that displays a plurality of icons associated with functions of the figure editing device along a predetermined direction, and an operation member that is used to specify and click one of the plurality of icons using a pointer. The figure editing device also includes a window display unit that displays, when one of the plurality of icons is clicked, attribute windows along a predetermined direction and adjacent to the icon which has been clicked, the attribute windows displaying functions or attributes corresponding to the icon which has been clicked, and a display position control unit that controls the icon display unit and the window display unit so as to change the arrangement of all the icons and the attribute windows along the predetermined direction such that the icons and the attribute windows do not overlap each other. The figure editing device also includes a determination unit that determines whether or not all the icons and all the attribute windows are displayed within, rather than extending off, a predetermined area in the case where the display positions are changed by the display position control unit. The figure editing device also includes a display range adjustment unit that controls the window display unit so as to close at least one of attribute windows that correspond to icons other than the icon which has been clicked and that are opened in the case where it is determined that all the icons and all the attribute windows are not displayed within, rather than extending off, the predetermined area.

Japanese Unexamined Patent Application Publication No. 10-91384 describes a tool bar display system that is used to display a tool bar, in which buttons that visualize a hierarchical menu of functions are arranged, on screen in software that includes input/output devices such as a display, a mouse, and a keyboard and a graphical user interface. The display system includes a tool bar display unit that detects depressing and the position of the mouse, and a button display position change unit that allows scrolling the buttons to enable display of all the buttons to be displayed in the tool bar. The display system also includes a button display size change unit that allows changing the sizes of the buttons, and a bar display position change unit that allows moving the tool bar to a corner of a window, reducing an area for auxiliary information such as the tool bar and increasing a work area for editing etc.

Japanese Unexamined Patent Application Publication (Translation of PCT Application) No. 2016-503218 describes a user interface that displays a tool bar. The user interface includes a canvas and an identifiable area in which a command predicted dynamically in response to interaction with the canvas surfaces, such as an area designated for the canvas, an area designated for a tool bar, and an area designated for a sidebar or a task pane.

SUMMARY

There is a technique of displaying a tool box at a position designated by a user within a display area, separately from tool bars in which various types of tools are registered, the tool box including a plurality of tools used relatively frequently and selected from among the tool bars to be registered. The tool box is displayed through an identical operation, and has an identical content. However, the user occasionally desires to use different tools, depending on the position at which he/she desires to display the tool box. Therefore, it is desirable to display a tool box with a content that matches the position at which the tool box is to be displayed.

Aspects of non-limiting embodiments of the present disclosure relate to providing an information processing apparatus and a non-transitory computer readable medium that allows varying the content of a tool box in accordance with the position in a display area at which the tool box is to be displayed in the case where the tool box is to be displayed through an identical operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a first display control section that performs control so as to display a display area that includes data to be edited; a detection section that detects a position designated by a user in the display area; a second display control section that performs control so as to display a tool box, in which a plurality of tools are registered, through an identical operation; and a third display control section that performs control, in a case where the tool box is to be displayed, so as to display the tool box with a different content in accordance with the position detected by the detection section.

BRIEF DESCRIPTION OF THE DRAWINGS

Exemplary embodiments of the present disclosure will be described in detail based on the following figures, wherein:

FIG. 18 illustrates an example of an operation log according to the third exemplary embodiment.

DETAILED DESCRIPTION

Exemplary embodiments of the present disclosure will be described in detail below with reference to the drawings.

First Exemplary Embodiment

Figure 1:
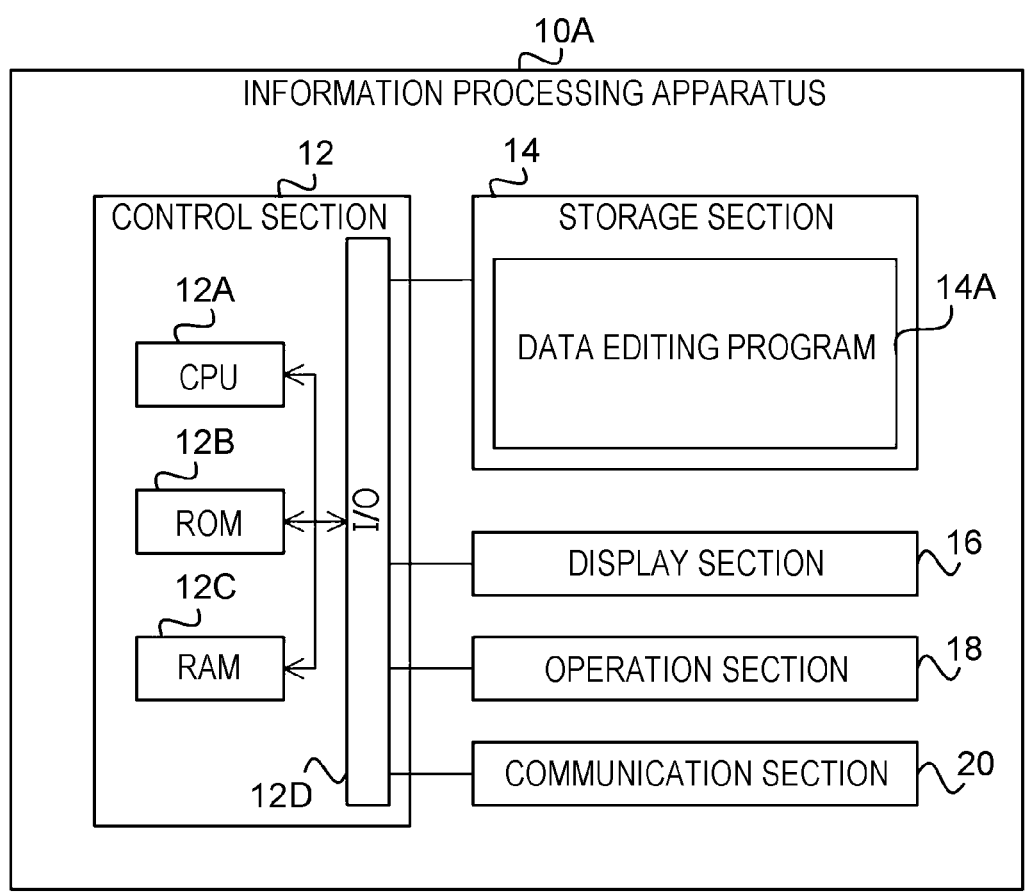
FIG. 1 is a block diagram illustrating an example of the electrical configuration of an information processing apparatus according to a first exemplary embodiment.

FIG. 1 is a block diagram illustrating an example of the electrical configuration of an information processing apparatus 10A according to a first exemplary embodiment.

As illustrated in FIG. 1, the information processing apparatus 10A according to the present exemplary embodiment includes a control section 12, a storage section 14, a display section 16, an operation section 18, and a communication section 20.

Examples of the information processing apparatus 10A according to the present exemplary embodiment include a general-purpose computer device such as a personal computer (PC) and a server computer.

The control section 12 includes a central processing unit (CPU) 12A, a read only memory (ROM) 12B, a random access memory (RAM) 12C, and an input/output interface (I/O) 12D, which are connected to each other via a bus.

Various functional sections including the storage section 14, the display section 16, the operation section 18, and the communication section 20 are connected to the I/O 12D. The various functional sections are communicable with the CPU 12A via the I/O 12D.

The control section 12 may be constituted as a sub control section that controls operation of a part of the information processing apparatus 10A, or may be constituted as a principal control section that controls operation of the entire information processing apparatus 10A. An integrated circuit such as a large scale integration (LSI) or an integrated circuit (IC) chip set, for example, is used for some or all of the blocks of the control section 12. Individual circuits may be used for the blocks, or partly or entirely integrated circuits may be used as well. The blocks may be provided integrally with each other, or some of the blocks may be provided separately. A part of each of the blocks may be provided separately. Not only the LSI but also a dedicated circuit or a general-purpose processor may be used for the integration of the control section 12.

Examples of the storage section 14 include a hard disk drive (HDD), a solid state drive (SSD), and a flash memory. The storage section 14 stores a data editing program 14A according to the present exemplary embodiment. The data editing program 14A may be stored in the ROM 12B. The data editing program 14A is implemented as a function of document management software such as DocuWorks (registered trademark) manufactured by Fuji Xerox Co., Ltd., for example.

The data editing program 14A may be installed in advance in the information processing apparatus 10A, for example. The data editing program 14A may be stored in a non-volatile storage medium, or distributed via a network, to be installed, as appropriate, in the information processing apparatus 10A to be implemented. Examples of the non-volatile storage medium are assumed to include a Compact Disc Read Only Memory (CD-ROM), a magneto-optical disk, an HDD, a Digital Versatile Disc Read Only Memory (DVD-ROM), a flash memory, and a memory card.

Examples of the display section 16 include a liquid crystal display (LCD) and an organic electro luminescence (EL) display. The display section 16 may integrally include a touch screen. The operation section 18 is provided with a device for operation input such as a keyboard and a mouse, for example. The display section 16 and the operation section 18 receive various types of instructions from the user of the information processing apparatus 10A. The display section 16 displays various types of information such as the result of a process executed in accordance with an instruction received from the user and a notification about the process.

The communication section 20 is connected to a network such as the Internet, a Local Area Network (LAN), and a Wide Area Network (WAN), and is communicable with an image forming apparatus, another PC, etc. via the network.

As discussed above, the user occasionally desires to use different tools, depending on the position at which he/she desires to display the tool box. Therefore, it is desirable to display a tool box with a content that matches the position at which the tool box is to be displayed.

Figure 2:
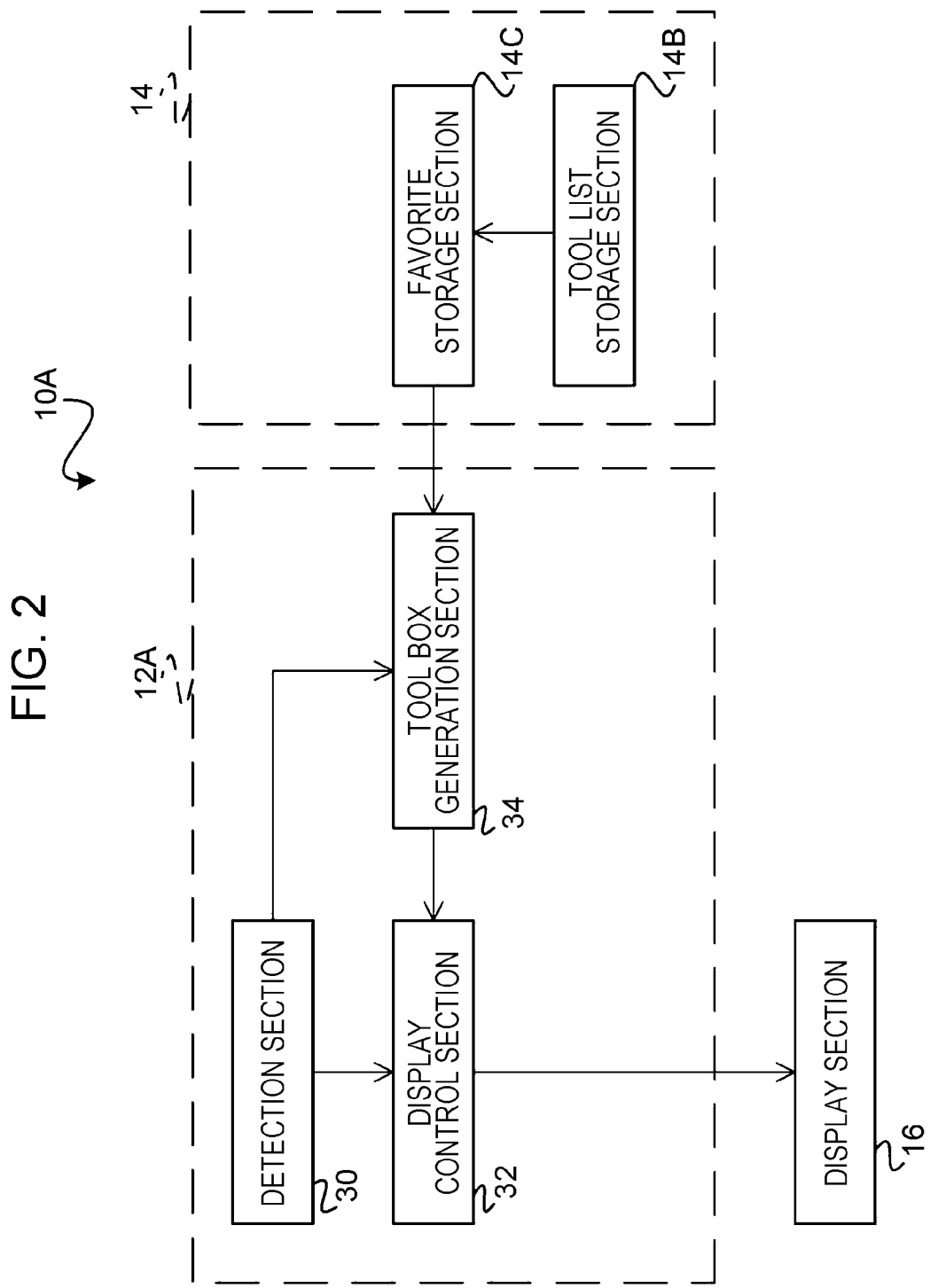
FIG. 2 is a block diagram illustrating an example of the functional configuration of the information processing apparatus according to the first exemplary embodiment.

To this end, the CPU 12A of the information processing apparatus 10A according to the present exemplary embodiment functions as various sections illustrated in FIG. 2 by writing the data editing program 14A, which is stored in the storage section 14, into the RAM 12C to be executed.

FIG. 2 is a block diagram illustrating an example of the functional configuration of the information processing apparatus 10A according to the first exemplary embodiment.

As illustrated in FIG. 2, the CPU 12A of the information processing apparatus 10A according to the present exemplary embodiment functions as a detection section 30, a display control section 32, and a tool box generation section 34. The display control section 32 is an example of a first display control section, a second display control section, and a third display control section.

Figure 3:
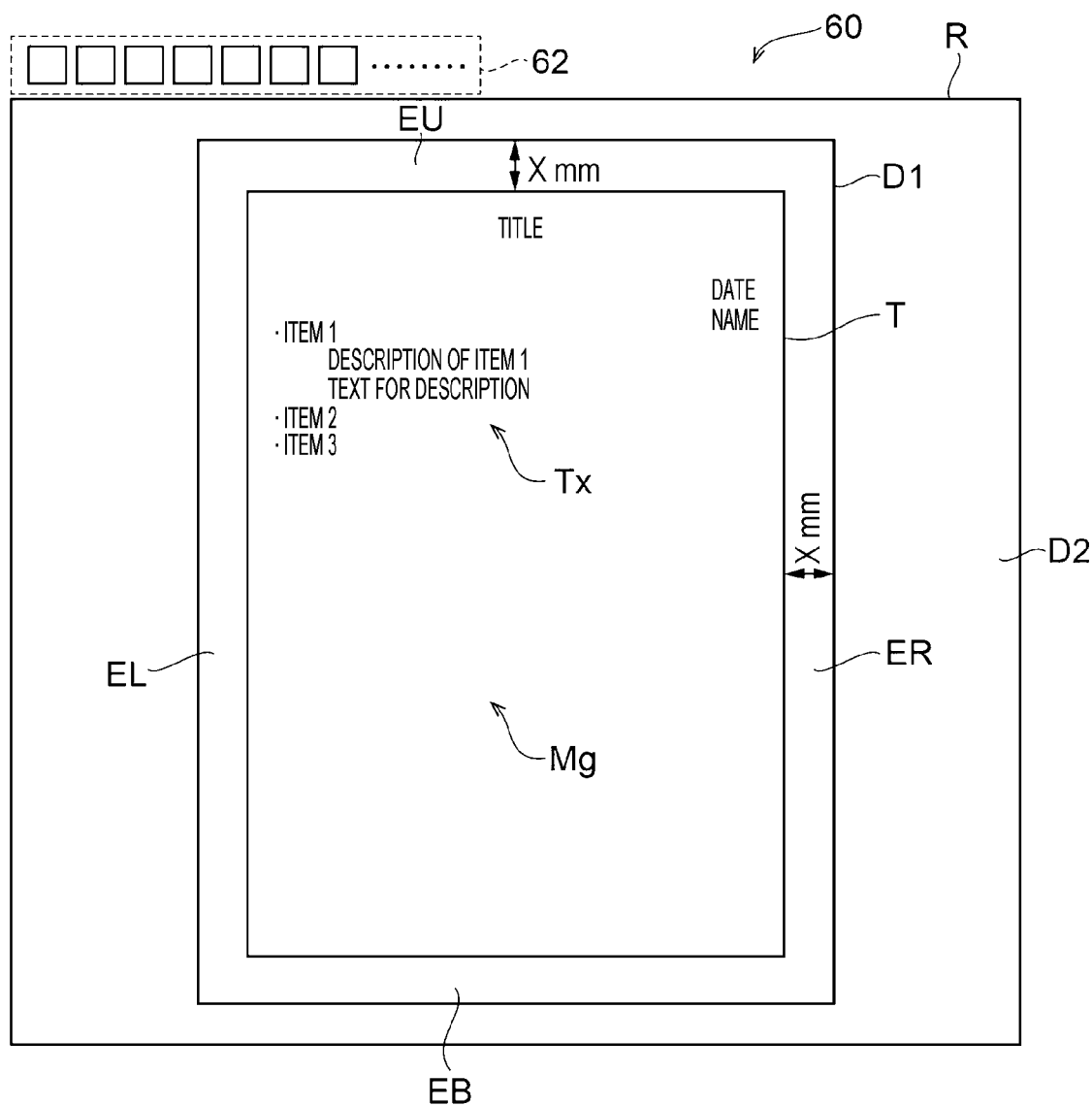
FIG. 3 is a front view illustrating an example of an application screen according to the exemplary embodiment.

By way of example, the display control section 32 according to the present exemplary embodiment performs control so as to display a display area, including data to be edited, on the display section 16 as illustrated in FIG. 3 to be discussed later. The term "data to be edited" as used herein includes document data, image data, and Computer Aided Design (CAD) data, by way of example. In the present exemplary embodiment, the data to be edited are described as document data.

The detection section 30 according to the present exemplary embodiment detects a position designated by the user in the display area which is displayed on the display section 16. Specifically, the detection section 30 detects a position to which the user has moved a cursor using a device for operation input such as a mouse and at which the user has performed a click operation.

The display control section 32 performs control so as to display a tool box, in which a plurality of tools are registered, on the display section 16 through an identical operation. The term "identical operation" as used herein means to execute the same operation. For example, a single click and a double click are not identical operations. A single right click and a single left click are also not identical operations. The tool box is always displayed on the display section 16 when the user executes an identical operation (e.g. a single left click or a single right click), for example.

Each of the terms "tool", "tool bar", and "tool box" is defined here. The "tool" is an individual function that is executable in an application program such as the document management software discussed above. The "tool bar" is a band-like area in which various types of tools are registered in advance, and is always displayed at the upper end portion of an application screen, for example. The term "tool box" includes a plurality of tools used relatively frequently and selected from among the tool bars to be registered. The tool box is displayed on an as-needed basis in response to a click operation etc. by the user. By way of example, a plurality of icons that indicate tools are disposed in the tool box.

In the case where a tool box is to be displayed, the display control section 32 performs control so as to display a tool box with a different content in accordance with the position detected by the detection section 30. The "tool box with a different content" includes a case where at least one of the plurality of icons is different and a case where the order of the plurality of icons is different.

The storage section 14 according to the present exemplary embodiment stores a tool list storage section 14B and a favorite storage section 14C.

The tool list storage section 14B stores a list of tools that may be registered in the tool box. The favorite storage section 14C stores, as favorites, some of the tools stored in the tool list storage section 14B and used relatively frequently by the user.

The tool box generation section 34 according to the present exemplary embodiment generates a tool box by extracting a plurality of tools that may be registered in a tool box from the favorite storage section 14C or the tool list storage section 14B, by way of example, in accordance with the position detected by the detection section 30. Specifically, the positions in the display area and the tools are stored in advance in correlation with each other in the favorite storage section 14C and the tool list storage section 14B, and the tool box generation section 34 extracts a plurality of tools by referencing the favorite storage section 14C or the tool list storage section 14B on the basis of the detected position. At this time, the tools are given respective orders of priority in advance so as to be extracted in the descending order of priority. The tools stored in the favorite storage section 14C are considered to be used relatively frequently. Therefore, it is desirable that such tools should be given higher orders of priority than the tools not stored in the favorite storage section 14C to be more likely to be extracted.

The tool box generated by the tool box generation section 34 is sent to the display control section 32. The display control section 32 performs control so as to display the received tool box on the display section 16.

Next, an application screen that includes the tool bar and the display area discussed above will be described with reference to FIG. 3.

FIG. 3 is a front view illustrating an example of an application screen 60 according to the present exemplary embodiment.

The application screen 60 illustrated in FIG. 3 is a screen displayed on the display section 16, and includes a tool bar 62 and a display area R.

The tool bar 62 is provided on the upper side of the display area R, and is a band-like area in which various types of tools are registered in advance as discussed above.

The display area R is an area that includes only document data D1 (hereinafter referred to simply as a "document D1") which is an example of the data to be edited and a background area D2 that illustrates the background of the document D1.

The document D1 has end areas provided at the upper, lower, right, and left portions. That is, an area with a width of X mm (e.g. X=30 mm) toward the inner side from the upper end of the document D1 is defined as an upper end area EU. Similarly, an area with a width of X mm toward the inner side from the lower end of the document D1 is defined as a lower end area EB, an area with a width of X mm toward the inner side from the right end of the document D1 is defined as a right end area ER, and an area with a width of X mm toward the inner side from the left end of the document D1 is defined as a left end area EL.

The document D1 has a body text area T that includes a character string portion Tx that includes a plurality of character strings and a margin portion Mg that excludes the character string portion Tx.

For example, the display control section 32 performs control so as to display the content of the tool box differently between a case where the position (hereinafter also referred to as a "detected position") detected by the detection section 30 is in the area of the document D1 and a case where the detected position is in the background area D2. Specifically, the display control section 32 performs control so as to display a tool box for use to edit the document D1 in the case where the detected position is in the area of the document D1, and so as to display a tool box for use other than to edit the document D1 in the case where the detected position is in the background area D2. The tool box for use other than to edit the document D1 include tools related to the output mode and tools for page navigation, by way of example. The specific display mode of such tool boxes will be discussed later.

The display control section 32 may perform control so as to display the content of the tool box differently between a case where the detected position is in the upper end area EU or the lower end area EB and a case where the detected position is in the left end area EL or the right end area ER. Specifically, in the case where the detected position is in the upper end area EU or the lower end area EB, the display control section 32 performs control so as to display a tool box that includes a tool for applying a first annotation correlated with the upper end area EU or the lower end area EB. In the case where the detected position is in the right end area ER or the left end area EL, on the other hand, the display control section 32 performs control so as to display a tool box that includes a tool for applying a second annotation correlated with the right end area ER or the left end area EL. The first annotation, the second annotation, and the specific display mode of the tool box will be discussed later.

The display control section 32 may perform control so as to display the content of the tool box differently between a case where the detected position is in the character string portion Tx and a case where the detected position is in the margin portion Mg. Specifically, the display control section 32 performs control so as to display a tool box that includes a tool for emphasizing a character string in the case where the detected position is in the character string portion Tx, and so as to display a tool box that includes a tool for inserting at least one of a figure and an image determined in advance in the case where the detected position is in the margin portion Mg. The specific display mode of such tool boxes will be discussed later.

Figure 4:
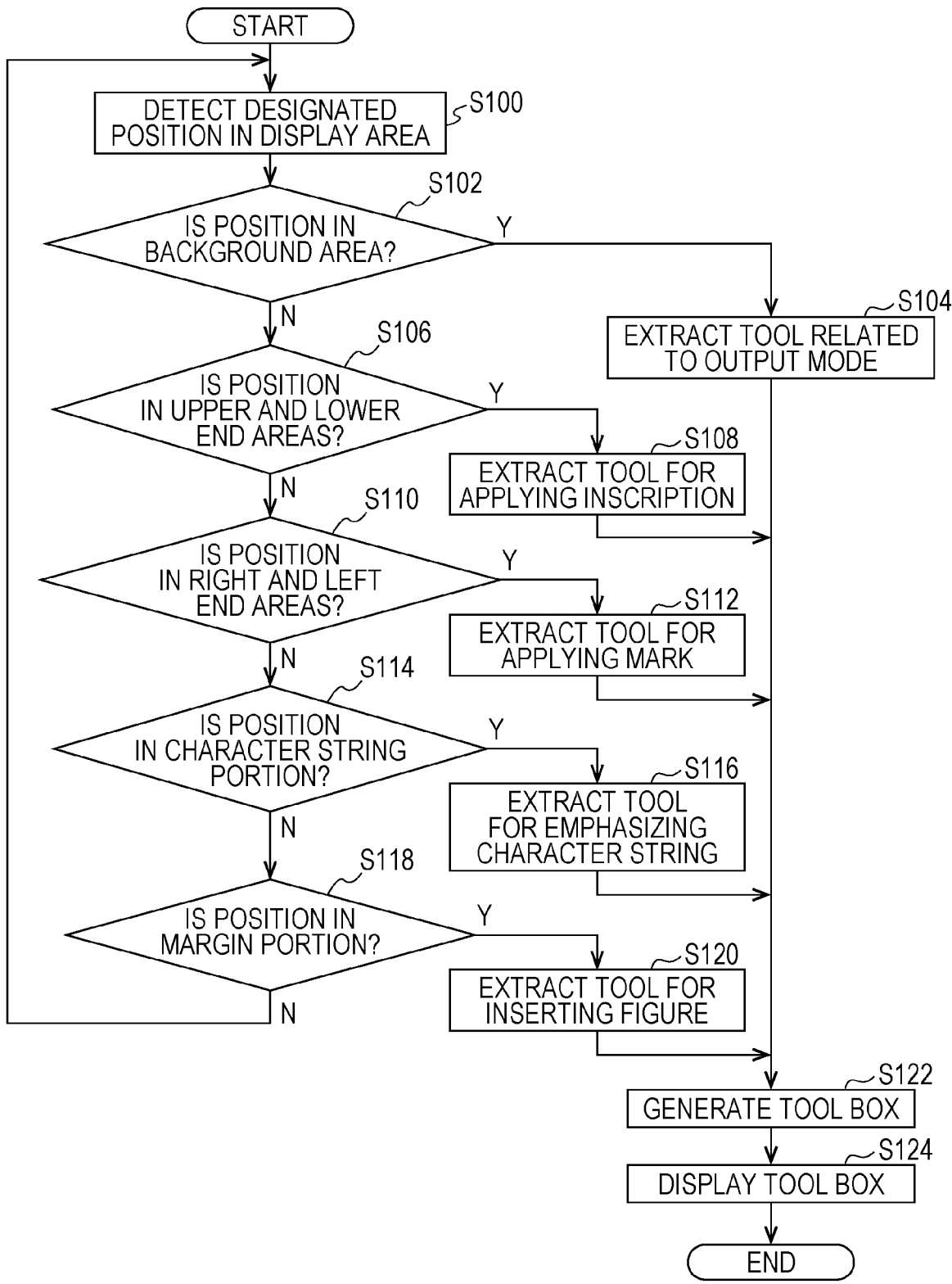
FIG. 4 is a flowchart illustrating an example of the flow of the process of a data editing program according to the first exemplary embodiment.

Next, the function of the information processing apparatus 10A according to the first exemplary embodiment will be described with reference to FIG. 4. FIG. 4 is a flowchart illustrating an example of the flow of the process of the data editing program 14A according to the first exemplary embodiment.

The application screen 60 illustrated in FIG. 3 discussed above, by way of example, is displayed on the display section 16 of the information processing apparatus 10A in accordance with a predetermined operation by the user.

In step S100 in FIG. 4, the detection section 30 detects a designated position in the display area R on the application screen 60 illustrated in FIG. 3 discussed above. Specifically, as discussed above, the detection section 30 detects a position to which the user has moved a cursor using a device for operation input such as a mouse and at which the user has performed a click operation.

In step S102, the tool box generation section 34 determines whether or not the position detected in step S100 is in the background area D2. In the case where it is determined that the detected position is in the background area D2 (in the case of a positive determination), the process proceeds to step S104. In the case where it is determined that the detected position is not in the background area D2 (in the case of a negative determination), the process proceeds to step S106.

In step S104, the tool box generation section 34 extracts a tool related to the output mode of the document D1, as an example of a tool for use other than to edit the document D1, from the favorite storage section 14C or the tool list storage section 14B, by way of example. The tool related to the output mode includes at least one of save, print, and mail attachment, for example. A tool for page navigation may be extracted as a tool for use other than to edit the document D1.

In step S106, the tool box generation section 34 determines whether or not the position detected in step S100 is in the upper end area EU or the lower end area EB. In the case where it is determined that the detected position is in the upper end area EU or the lower end area EB (in the case of a positive determination), the process proceeds to step S108. In the case where it is determined that the detected position is not in the upper end area EU or the lower end area EB (in the case of a negative determination), the process proceeds to step S110.

In step S108, the tool box generation section 34 extracts a tool for applying an inscription to the document D1 from the favorite storage section 14C or the tool list storage section 14B, by way of example. The inscription is an example of the first annotation. The inscription includes at least one of an approval mark, a date mark, and a stamp, for example.

In step S110, the tool box generation section 34 determines whether or not the position detected in step S100 is in the right end area ER or the left end area EL. In the case where it is determined that the detected position is in the right end area ER or the left end area EL (in the case of a positive determination), the process proceeds to step S112. In the case where it is determined that the detected position is not in the right end area ER or the left end area EL (in the case of a negative determination), the process proceeds to step S114.

In step S112, the tool box generation section 34 extracts a tool for applying a mark to the document D1 from the favorite storage section 14C or the tool list storage section 14B, by way of example. The mark is an example of the second annotation. The mark includes a sticky note that enables input of a comment, for example.

In step S114, the tool box generation section 34 determines whether or not the position detected in step S100 is in the character string portion Tx. Specifically, it is determined whether or not the detected position is a position of any character string included in the character string portion Tx. In the case where it is determined that the detected position is in the character string portion Tx (in the case of a positive determination), the process proceeds to step S116. In the case where it is determined that the detected position is not in the character string portion Tx (in the case of a negative determination), the process proceeds to step S118.

In step S116, the tool box generation section 34 extracts a tool for emphasizing a character string from the favorite storage section 14C or the tool list storage section 14B, by way of example. Examples of the tool for emphasizing a character string include a marker, underlining, bold type, italic type, shading, and surrounding lines.

In step S118, the tool box generation section 34 determines whether or not the position detected in step S100 is in the margin portion Mg. In the case where it is determined that the detected position is in the margin portion Mg (in the case of a positive determination), the process proceeds to step S120. In the case where it is determined that the detected position is not in the margin portion Mg (in the case of a negative determination), the process returns to step S100 to be repeated.

In step S120, the tool box generation section 34 extracts a tool for inserting a figure (such as a round frame or a rectangular frame that surrounds the entire character string, for example) for emphasizing the entire character string portion Tx from the favorite storage section 14C or the tool list storage section 14B, by way of example. This tool may be a tool for inserting an image for emphasizing the entire character string portion Tx.

Next, in step S122, the tool box generation section 34 generates a tool box corresponding to each step using the tool extracted in each of steps S104, S108, S112, S116, and S120.

In step S124, the display control section 32 performs control so as to display a tool box corresponding to each step and generated in step S122 on the display section 16, and ends the sequence of processes performed by the data editing program 14A.

Next, the specific display mode of the tool box which is displayed with a different content in accordance with the detected position will be described with reference to FIGS. 5 to 9.

Figure 5:
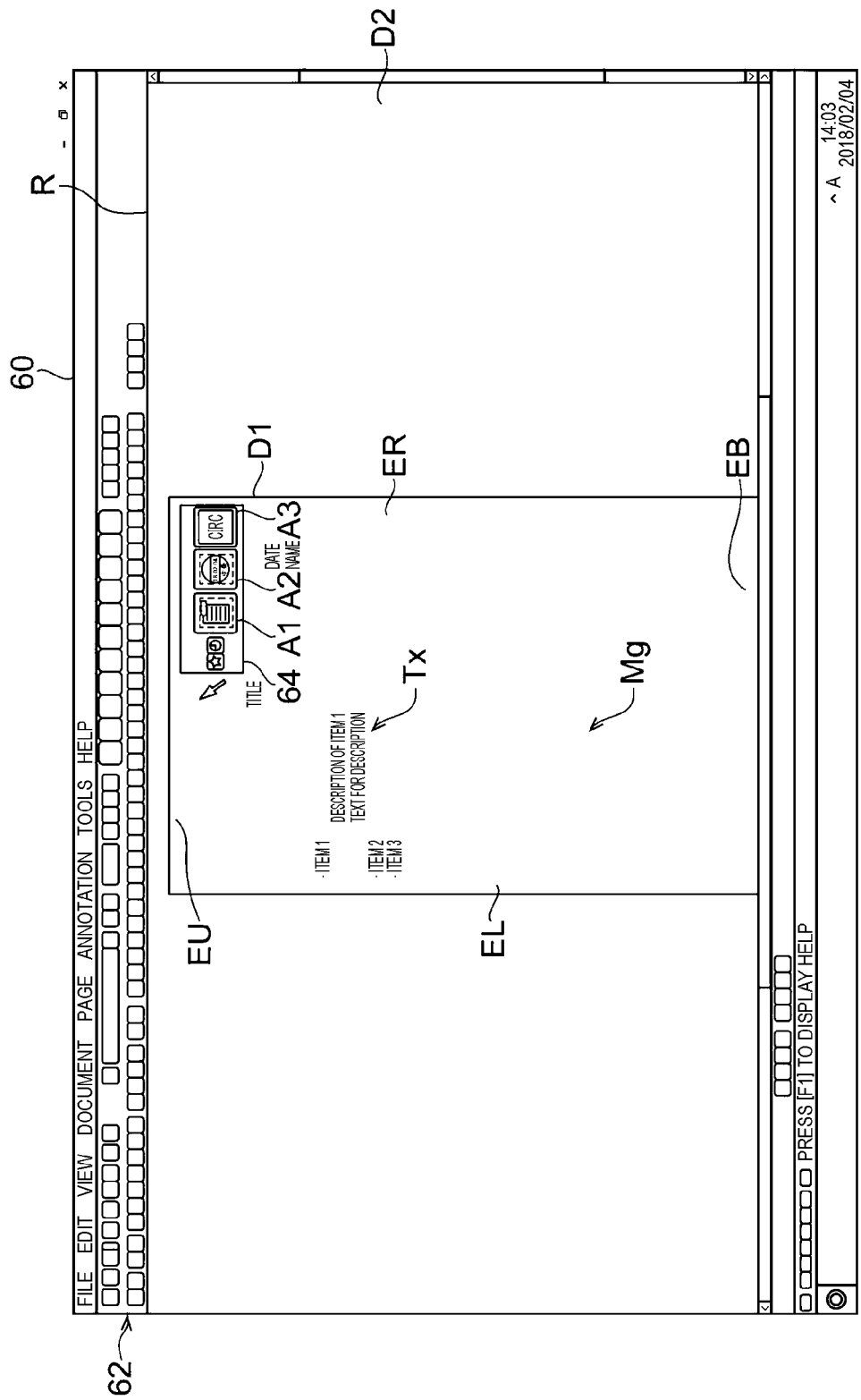
FIG. 5 is a front view illustrating an example of an application screen that includes a tool box according to the first exemplary embodiment.

FIG. 5 is a front view illustrating an example of an application screen 60 that includes a tool box 64 according to the first exemplary embodiment.

The application screen 60 according to the present exemplary embodiment includes the tool bar 62 and the display area R as with the example illustrated in FIG. 3 discussed above.

The application screen 60 illustrated in FIG. 5 displays the tool box 64 which is displayed in the case where the detected position is in the upper end area EU.

That is, in the case where a click operation is performed in the upper end area EU, the tool box 64 which includes a plurality of tools used relatively frequently at the upper portion of the document D1 is displayed. The tool box 64 illustrated in FIG. 5 includes a header edit A1, a date mark A2, and a stamp A3, for example, as the plurality of tools. The date mark A2 and the stamp A3 are examples of the first annotation. It is only necessary that the plurality of tools registered in the tool box 64 should include a tool for applying an inscription. Such tools are not limited to the date mark and the stamp, and may be an approval mark etc.

When the user selects a desired tool from among the plurality of tools included in the tool box 64, the selected tool is executed. For example, in the case where the date mark A2 is selected, a date mark is applied to the upper end area EU of the document D1 to be displayed.

The number and the content of the tools registered in the tool box 64 are not limited thereto, and may be changed, as appropriate, in accordance with the preference of the user. In the present exemplary embodiment, the tools are represented using icons. However, the tools may be represented using character strings.

The content of the tool box 64 may be different between the upper end area EU and the lower end area EB. In the case where a click operation is performed in the lower end area EB, the tool box 64 which includes a plurality of tools used relatively frequently at the lower portion of the document D1 is displayed. In this case, the tool box 64 includes a footer edit, a page number, a stamp, etc., for example, as the plurality of tools.

Figure 6:
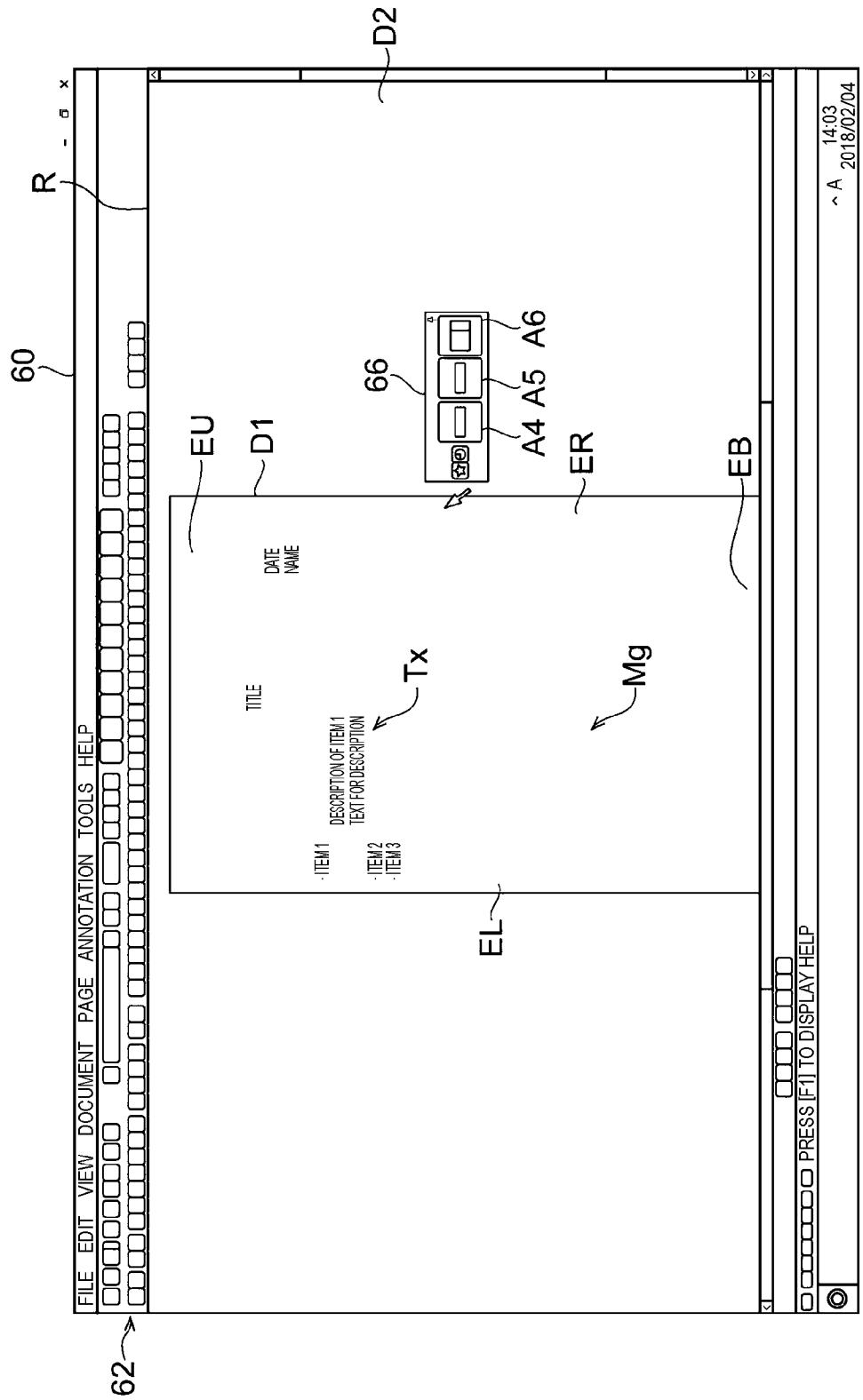
FIG. 6 is a front view illustrating an example of an application screen that includes another tool box according to the first exemplary embodiment.

FIG. 6 is a front view illustrating an example of an application screen 60 that includes another tool box 66 according to the first exemplary embodiment.

The application screen 60 illustrated in FIG. 6 displays the tool box 66 which is displayed in the case where the detected position is in the right end area ER.

That is, in the case where a click operation is performed in the right end area ER, the tool box 66 which includes a plurality of tools used relatively frequently at the right side portion of the document D1 is displayed. The tool box 66 illustrated in FIG. 6 includes a plurality of types of sticky notes A4 to A6 (e.g. the sticky note A4 as a blue sticky note, the sticky note A5 as a green sticky note, and the sticky note A6 as a sticky note), for example, as the plurality of tools. The sticky notes A4 to A6 include a function of allowing input of a comment. The sticky notes A4 to A6 are examples of the second annotation. It is only necessary that the plurality of tools registered in the tool box 66 should include a tool for applying a mark. Such tools are not limited to the sticky notes.

When the user selects a desired tool from among the plurality of tools included in the tool box 66, the selected tool is executed. For example, in the case where the sticky note A5 is selected, a green sticky note is applied to the right end area ER of the document D1 to be displayed.

The content of the tool box 66 may be different between the right end area ER and the left end area EL, as in the case of the upper end area EU and the lower end area EB. However, it is considered that tools used at the right side portion and tools used at the left side portion are generally the same as each other. Therefore, in the present exemplary embodiment, in the case where a click operation is performed in the left end area EL, the tool box 66 with the same content as that for the right end area ER is displayed.

Figure 7:
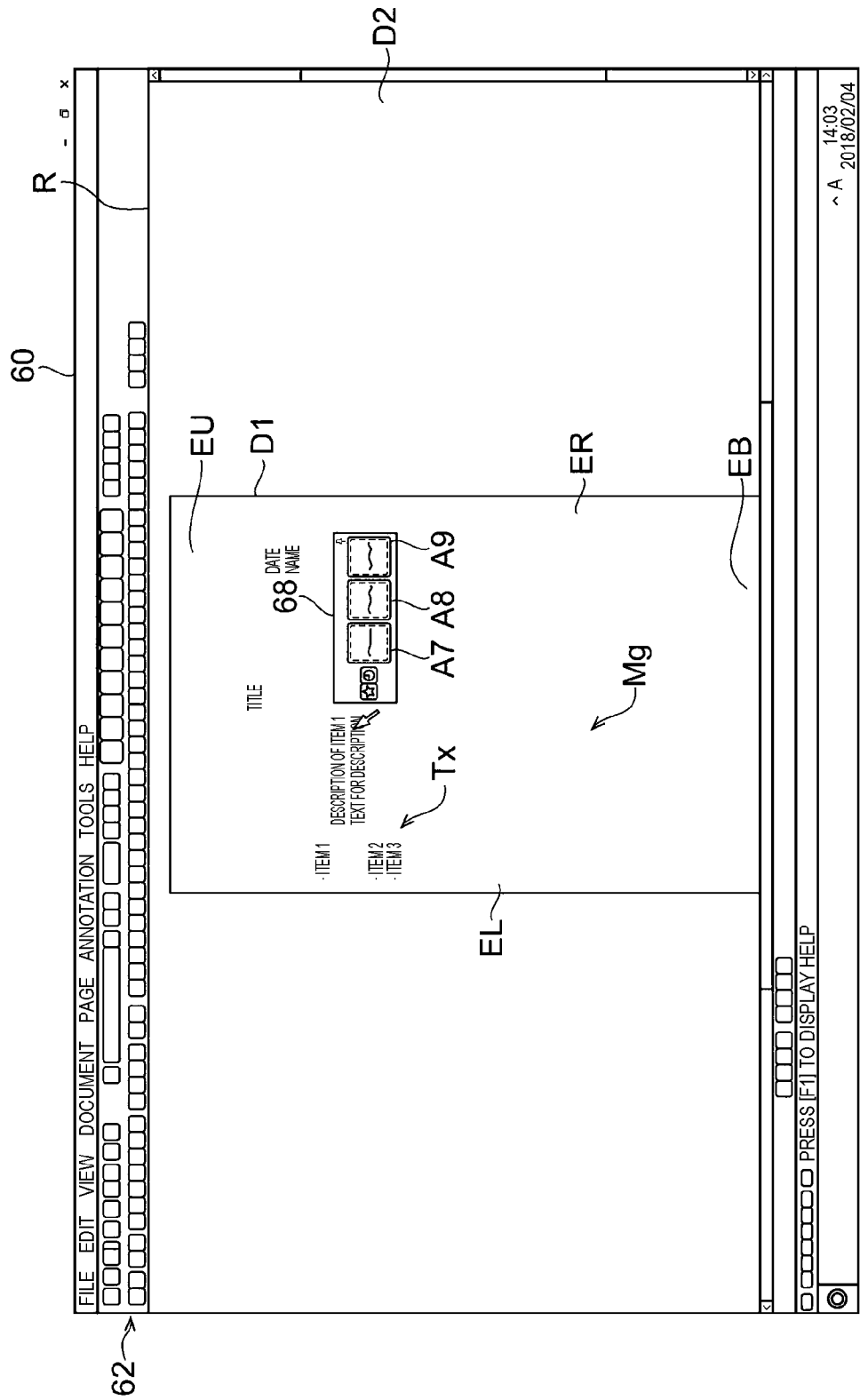
FIG. 7 is a front view illustrating an example of an application screen that includes still another tool box according to the first exemplary embodiment.

FIG. 7 is a front view illustrating an example of an application screen 60 that includes still another tool box 68 according to the first exemplary embodiment.

The application screen 60 illustrated in FIG. 7 displays the tool box 68 which is displayed in the case where the detected position is in the character string portion Tx.

That is, in the case where a click operation is performed at the position of one character string included in the character string portion Tx, the tool box 68 which includes a plurality of tools used relatively frequently for a character string is displayed. The tool box 68 illustrated in FIG. 7 includes markers A7 to A9 in a plurality of colors (e.g. the marker A7 in red color, the marker A8 in green color, and the marker A9 in yellow color), for example, as the plurality of tools. It is only necessary that the plurality of tools registered in the tool box 68 should be a tool for emphasizing a character string. Such tools are not limited to the markers.

When the user selects a desired tool from among the plurality of tools included in the tool box 68, the selected tool is executed. For example, in the case where the maker A8 is selected, the designated character string is displayed with a green marker applied thereto.

Figure 8:
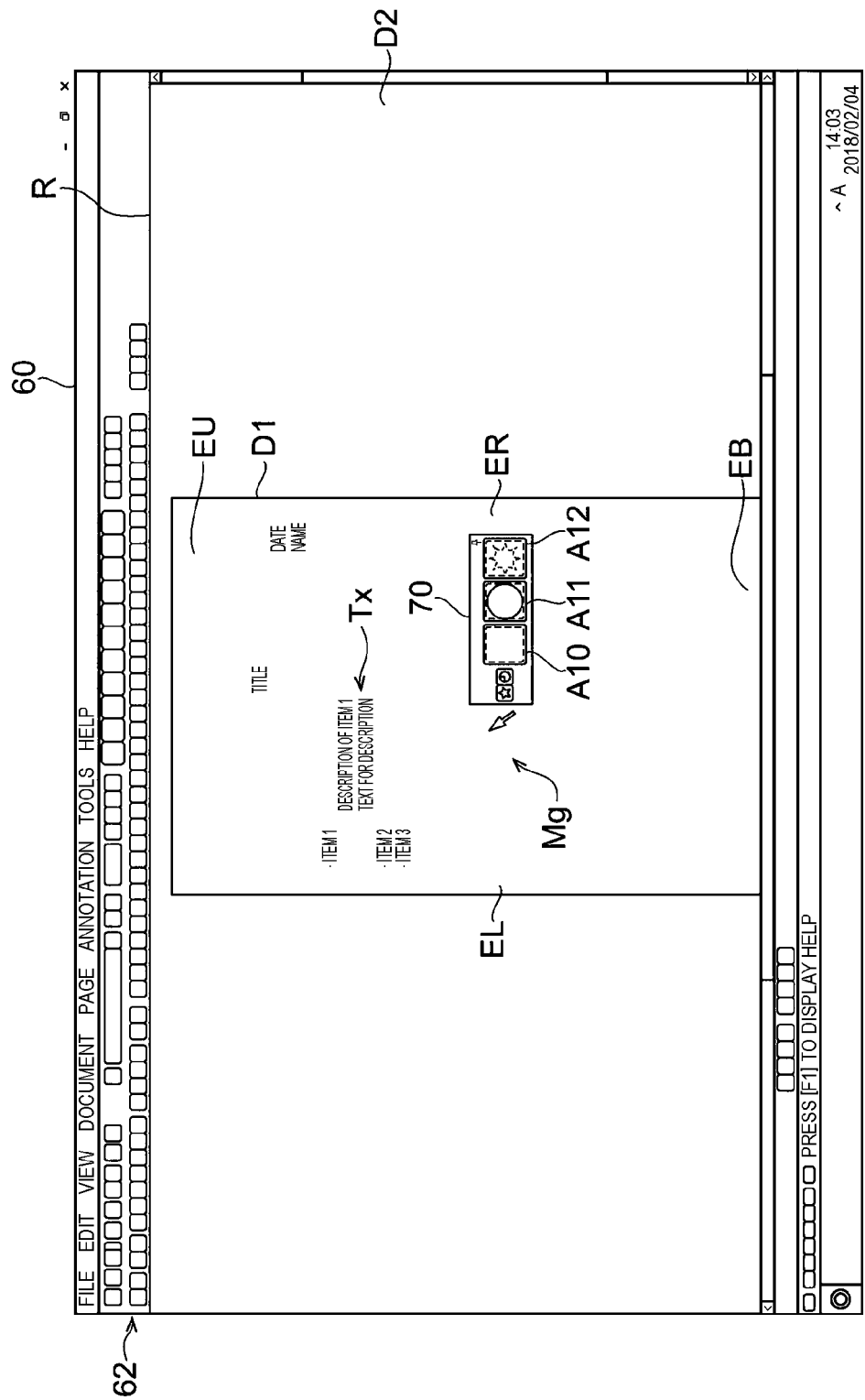
FIG. 8 is a front view illustrating an example of an application screen that includes still another tool box according to the first exemplary embodiment.

FIG. 8 is a front view illustrating an example of an application screen 60 that includes still another tool box 70 according to the first exemplary embodiment.

The application screen 60 illustrated in FIG. 8 displays the tool box 70 which is displayed in the case where the detected position is in the margin portion Mg.

That is, in the case where a click operation is performed in the margin portion Mg, the tool box 70 which includes a plurality of tools used relatively frequently in the margin portion Mg is displayed. The tool box 70 illustrated in FIG. 8 includes a plurality of types of figures A10 to A12 (e.g. the figure A10 in a rectangular shape, the figure A11 in a round shape, and the figure A12 in a serrated shape), for example, as the plurality of tools. It is only necessary that the plurality of tools registered in the tool box 70 should be a tool for emphasizing the entirety of character strings. Such tools are not limited to the figures, and may be images etc.

When the user selects a desired tool from among the plurality of tools included in the tool box 70, the selected tool is executed. For example, in the case where the figure A10 is selected, the entirety of the character strings in the document D1 is surrounded by a rectangular frame to be displayed.

Figure 9:
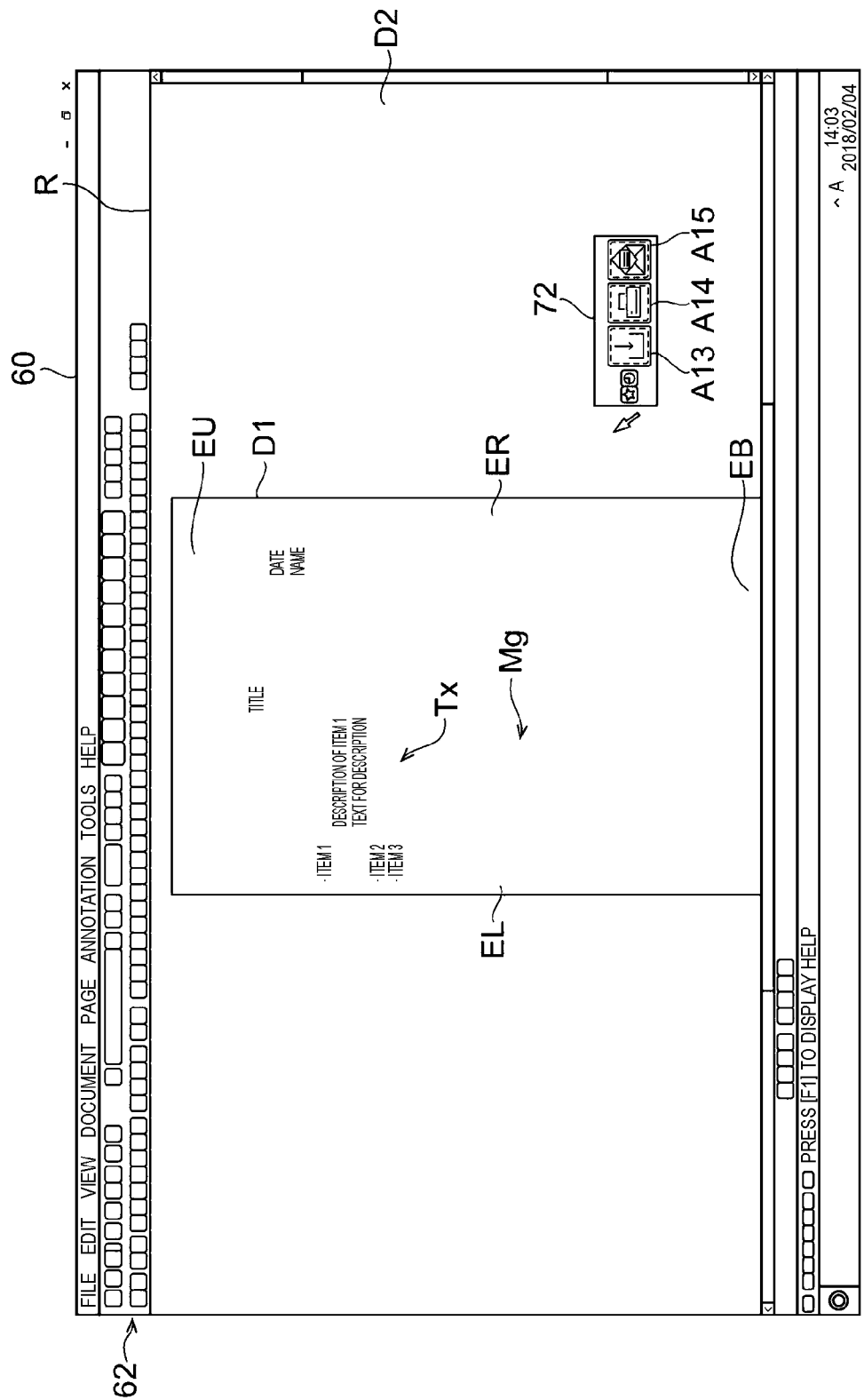
FIG. 9 is a front view illustrating an example of an application screen that includes still another tool box according to the first exemplary embodiment.

FIG. 9 is a front view illustrating an example of an application screen 60 that includes still another tool box 72 according to the first exemplary embodiment.

The application screen 60 illustrated in FIG. 9 displays the tool box 72 which is displayed in the case where the detected position is in the background area D2.

That is, in the case where a click operation is performed in the background area D2, the tool box 72 which includes a plurality of tools used relatively frequently for use other than to edit the document D1 is displayed. The tool box 72 illustrated in FIG. 9 includes save A13, print A14, and mail attachment A15 which are related to the output mode, for example, as the plurality of tools. It is only necessary that the plurality of tools registered in the tool box 72 should be a tool for use other than editing. Such tools are not limited to those related to the output mode, and may be those for page navigation etc.

When the user selects a desired tool from among the plurality of tools included in the tool box 72, the selected tool is executed. For example, in the case where the print A14 is selected, the document D1 is printed.

Thus, according to the present exemplary embodiment, the position in a display area at which a tool box is to be displayed is detected and the content of the tool box is varied in accordance with the detected position in the case where the tool box is to be displayed through an identical operation.

Second Exemplary Embodiment

In the first exemplary embodiment described above, the content of a tool box is varied in consideration of the position in a display area at which the tool box is to be displayed. In the present exemplary embodiment, the content of a tool box is varied in consideration of not only the position in a display area at which the tool box is to be displayed but also the content of the last operation performed by the user before the position is detected.

Figure 10:
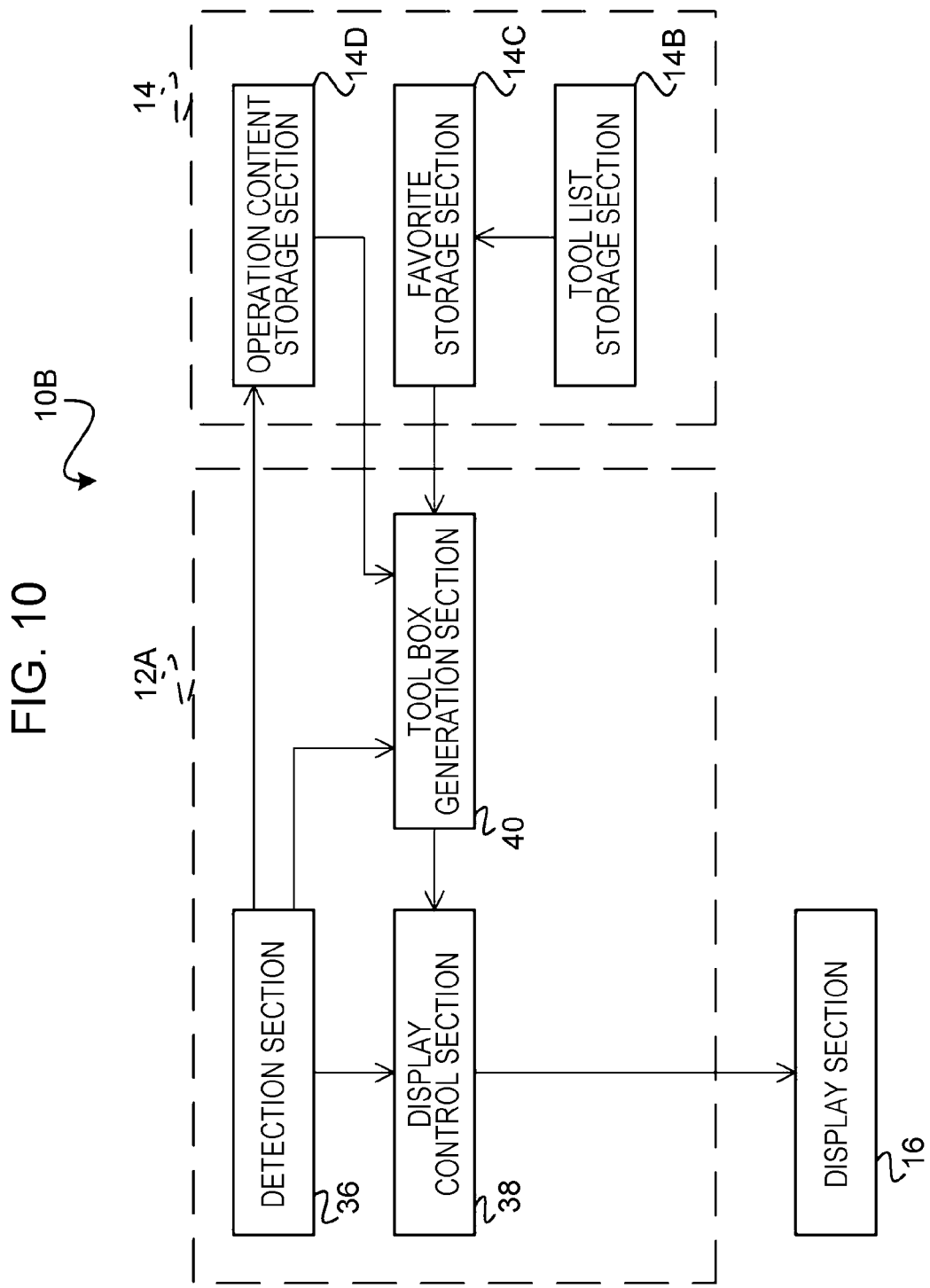
FIG. 10 is a block diagram illustrating an example of the functional configuration of an information processing apparatus according to a second exemplary embodiment.

FIG. 10 is a block diagram illustrating an example of the functional configuration of an information processing apparatus 10B according to a second exemplary embodiment.

Constituent elements that have substantially the same function as those of the information processing apparatus 10A according to the first exemplary embodiment described above are denoted by the same reference numeral to omit repeated description.

As illustrated in FIG. 10, the CPU 12A of the information processing apparatus 10B according to the present exemplary embodiment functions as a detection section 36, a display control section 38, and a tool box generation section 40. The display control section 38 is an example of a first display control section, a second display control section, and a third display control section. The storage section 14 stores the tool list storage section 14B, the favorite storage section 14C, and an operation content storage section 14D.

The detection section 36 according to the present exemplary embodiment not only detects a position designated by the user in the display area R through a click operation, but also detects the content of the last operation performed by the user before the position is detected.

The display control section 38 according to the present exemplary embodiment performs control so as to display the content of a tool box differently in accordance with the detected position and the content of the last operation.

The detection section 36 chronologically detects the content of operations performed by the user on the document D1, and stores the detected content of the operations in the operation content storage section 14D. When the user starts a tool box through a click operation, the tool box generation section 40 according to the present exemplary embodiment acquires the detected position from the detection section 36, and acquires the content of the last operation before the tool box is started from the operation content storage section 14D. The tool box generation section 40 generates a tool box by extracting a plurality of tools that may be registered in a tool box from the favorite storage section 14C or the tool list storage section 14B, by way of example, in accordance with the detected position and the content of the last operation that have been acquired. Specifically, the positions in the display area, the content of the operations by the user, and the tools have been stored in advance in correlation with each other in the favorite storage section 14C and the tool list storage section 14B, and the tool box generation section 40 extracts a plurality of tools by referencing the favorite storage section 14C or the tool list storage section 14B on the basis of the detected position and the content of the last operation.

The tool box generated by the tool box generation section 40 is sent to the display control section 38. The display control section 38 performs control so as to display the received tool box on the display section 16.

Examples of the content of the last operation described above include an operation to select a character string, a drag operation to designate a size, etc. For example, in the case where the detected position is in the upper end area EU or the lower end area EB (see FIG. 3) and the content of the last operation is an operation to designate a size, the display control section 38 displays a tool box that includes a tool for applying an annotation correlated with the upper end area EU or the lower end area EB. In the case where the tool in the tool box is selected, the display control section 38 further performs control so as to display an annotation in accordance with the size. The term "annotation" as used herein includes an inscription such as an approval mark, a date mark, and a stamp, for example.

Figure 11:
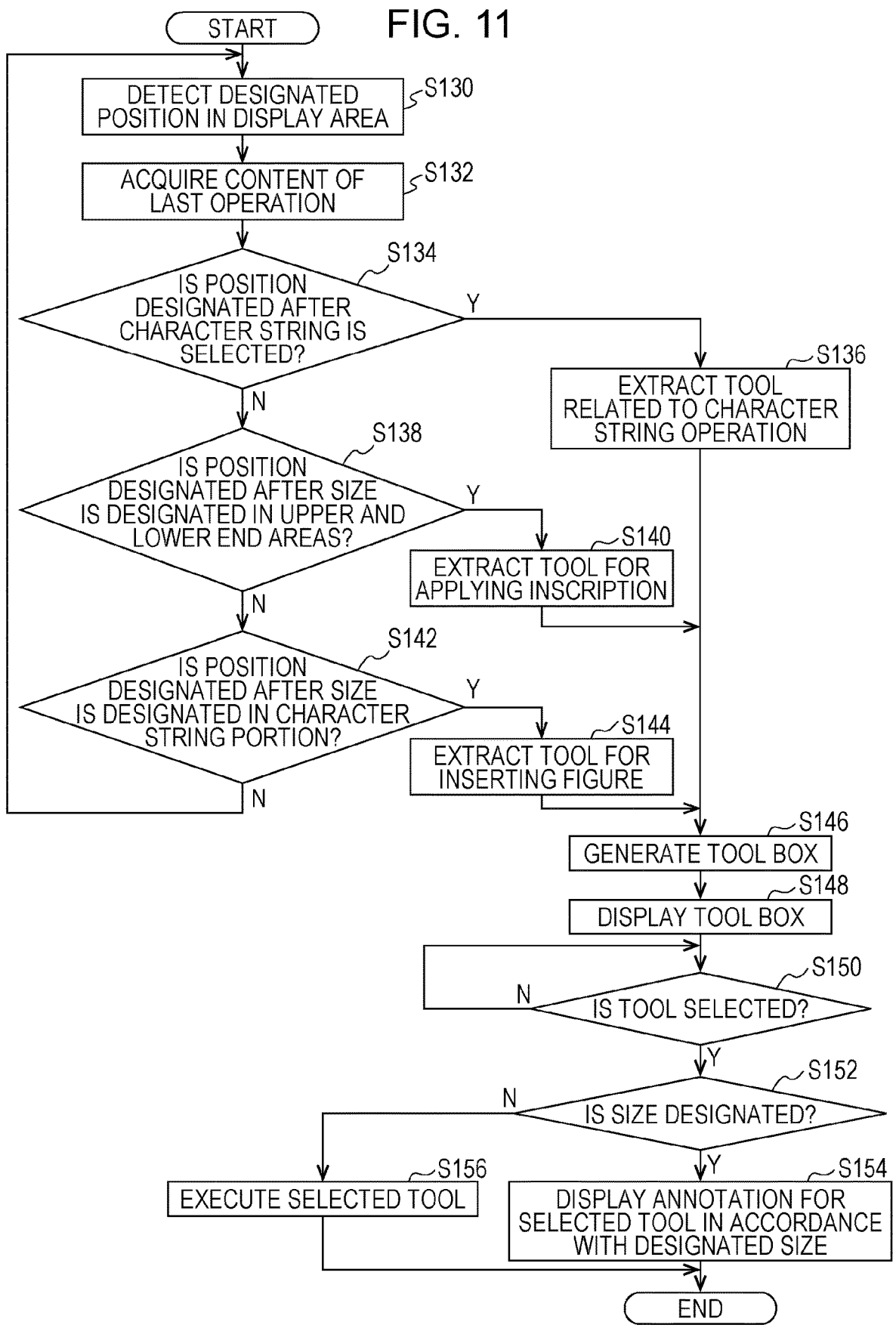
FIG. 11 is a flowchart illustrating an example of the flow of the process of a data editing program according to the second exemplary embodiment.

Next, the function of the information processing apparatus 10B according to the second exemplary embodiment will be described with reference to FIG. 11. FIG. 11 is a flowchart illustrating an example of the flow of the process of the data editing program 14A according to the second exemplary embodiment.

The application screen 60 illustrated in FIG. 3 discussed above, by way of example, is displayed on the display section 16 of the information processing apparatus 10B in accordance with a predetermined operation by the user. The detection section 36 chronologically detects the content of operations performed by the user on the document D1, and stores the detected content of the operations in the operation content storage section 14D.

In step S130 in FIG. 11, the detection section 36 detects a designated position in the display area R on the application screen 60 illustrated in FIG. 3 discussed above. Specifically, as discussed above, the detection section 36 detects a position to which the user has moved a cursor using a device for operation input such as a mouse and at which the user has performed a click operation.

In step S132, the tool box generation section 40 acquires the content of the last operation performed by the user before the position is detected in step S130 from the operation content storage section 14D. In the case where the content of the last operation is not acquired, steps S102 to S124 illustrated in FIG. 4 discussed above are executed.

In step S134, the tool box generation section 40 determines whether or not the position detected in step S130 and the content of the last operation acquired in step S132 indicate that "a position is designated after a character string is selected". In the case where it is determined that the detected position and the content of the last operation indicate that "a position is designated after a character string is selected" (in the case of a positive determination), the process proceeds to step S136. In the case where it is determined that the detected position and the content of the last operation do not indicate that "a position is designated after a character string is selected" (in the case of a negative determination), the process proceeds to step S138.

In step S136, the tool box generation section 40 extracts a tool related to character string operation from the favorite storage section 14C or the tool list storage section 14B, by way of example. Examples of the tool related to character string operation include copy (duplication), bold type, and underlining.

In step S138, the tool box generation section 40 determines whether or not the position detected in step S130 and the content of the last operation acquired in step S132 indicate that "a position is designated after a size is designated in the upper and lower end areas". In the case where it is determined that the detected position and the content of the last operation indicate that "a position is designated after a size is designated in the upper and lower end areas" (in the case of a positive determination), the process proceeds to step S140. In the case where it is determined that the detected position and the content of the last operation do not indicate that "a position is designated after a size is designated in the upper and lower end areas" (in the case of a negative determination), the process proceeds to step S142.

In step S140, the tool box generation section 40 extracts a tool for applying an inscription to the document D1 from the favorite storage section 14C or the tool list storage section 14B, by way of example. The inscription is an example of the annotation. The inscription includes at least one of an approval mark, a date mark, and a stamp, for example.

In step S142, the tool box generation section 40 determines whether or not the position detected in step S130 and the content of the last operation acquired in step S132 indicate that "a position is designated after a size is designated in the character string portion". In the case where it is determined that the detected position and the content of the last operation indicate that "a position is designated after a size is designated in the character string portion" (in the case of a positive determination), the process proceeds to step S144. In the case where it is determined that the detected position and the content of the last operation do not indicate that "a position is designated after a size is designated in the character string portion" (in the case of a negative determination), the process returns to step S130 to be repeated.

In step S144, the tool box generation section 40 extracts a tool for inserting a figure for emphasizing the character string portion from the favorite storage section 14C or the tool list storage section 14B, by way of example. The figure is an example of the annotation. The figure includes a rectangular shape, a round shape, and a cloud shape, for example.

Next, in step S146, the tool box generation section 40 generates a tool box corresponding to each step using the tool extracted in each of steps S136, S140, and S144.

In step S148, the display control section 38 performs control so as to display a tool box corresponding to each step and generated in step S146 on the display section 16.

In step S150, the display control section 38 determines whether or not a tool in the tool box displayed in step S148 is selected. In the case where it is determined that a tool is selected (in the case of a positive determination), the process proceeds to step S152. In the case where it is determined that a tool is not selected (in the case of a negative determination), the process stands by in step S150.

In step S152, the display control section 38 determines whether or not a size is designated in the content of the last operation acquired in step S132. In the case where it is determined that a size is designated (in the case of a positive determination), the process proceeds to step S154. In the case where it is determined that a size is not designated (in the case of a negative determination), the process proceeds to step S156. That is, the process proceeds to step S154 in the case where a tool box that includes the tool extracted in step S140 or step S144 is displayed in step S148, and proceeds to step S156 in the case where a tool box that includes the tool extracted in step S136 is displayed.

In step S154, the display control section 38 performs control so as to display the annotation for the selected tool in accordance with the designated size, and ends the sequence of processes performed by the data editing program 14A.

In step S156, the display control section 38 executes the selected tool, and ends the sequence of processes performed by the data editing program 14A.

Next, the specific display mode of the tool box which is displayed with a different content in accordance with the detected position and the content of the last operation will be described with reference to FIGS. 12 to 15.

Figure 12:
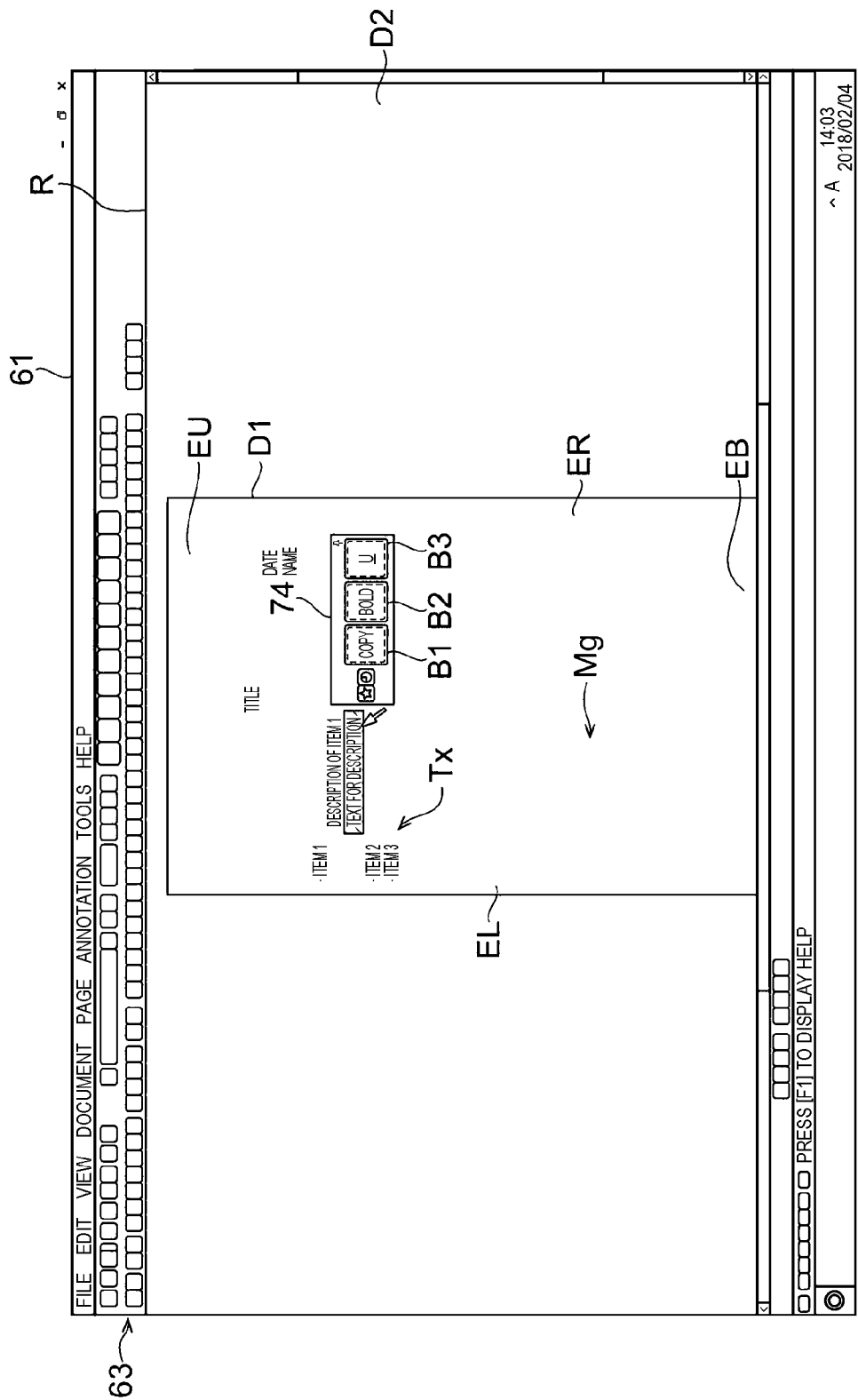
FIG. 12 is a front view illustrating an example of an application screen that includes a tool box according to the second exemplary embodiment.

FIG. 12 is a front view illustrating an example of an application screen 61 that includes a tool box 74 according to the second exemplary embodiment.

The application screen 61 according to the present exemplary embodiment includes a tool bar 63 and the display area R.

The application screen 61 illustrated in FIG. 12 displays the tool box 74 which is displayed in the case where the detected position and the content of the last operation indicate that "a position is designated after a character string is selected" discussed above.

That is, in the case where a click operation is performed after one character string included in the character string portion Tx is selected, the tool box 74 which includes a plurality of tools used relatively frequently for a character string is displayed. The tool box 74 illustrated in FIG. 12 includes copy (duplication) B1, bold type B2, and underlining B3 which are related to character string operation, for example, as the plurality of tools. It is only necessary that the plurality of tools registered in the tool box 74 should include a tool related to character string operation. Such tools are not limited to those described above.

When the user selects a desired tool from among the plurality of tools included in the tool box 74, the selected tool is executed. For example, in the case where the bold type B2 is selected, the selected character string in the document D1 is made bold to be displayed.

Figure 13:
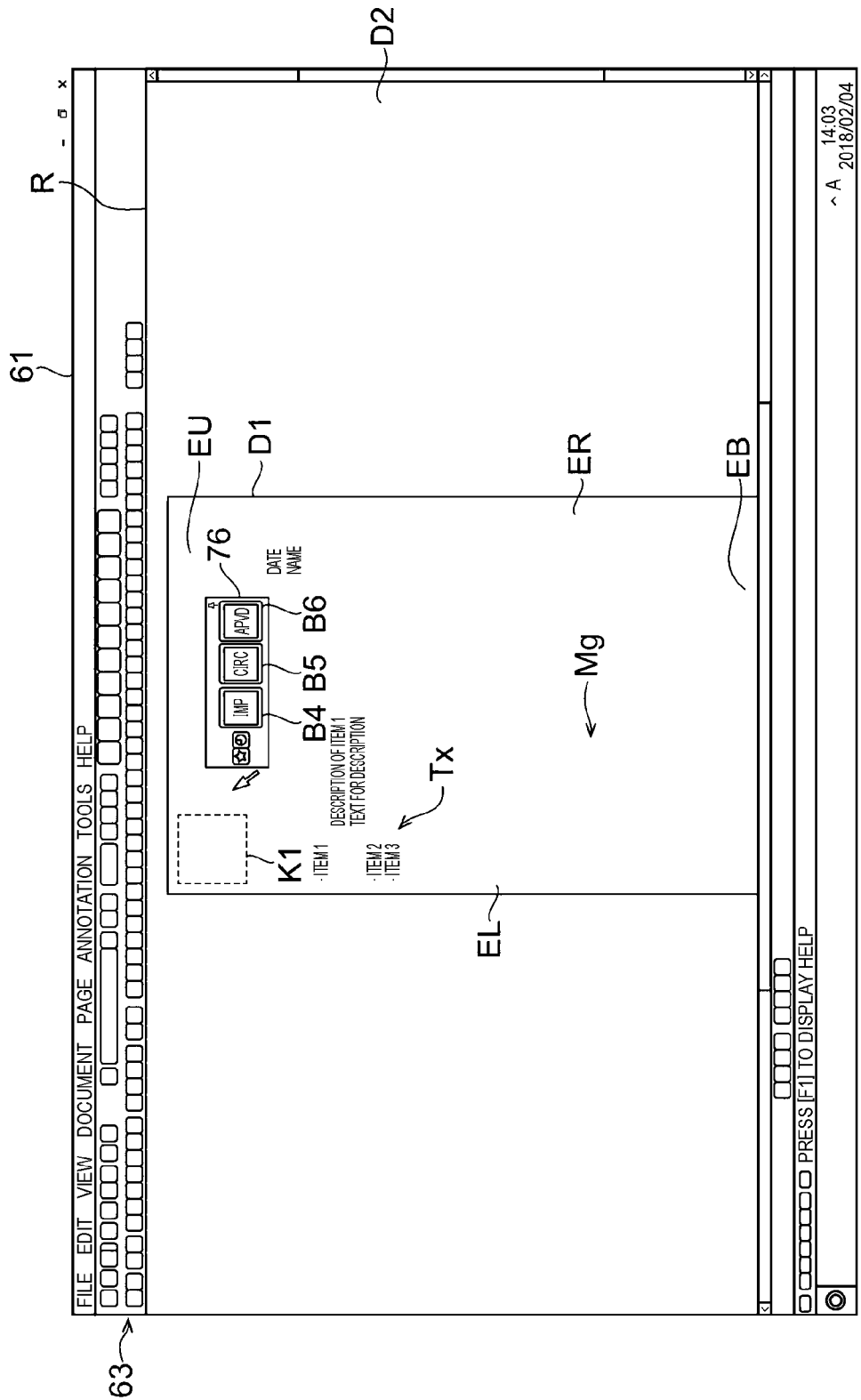
FIG. 13 is a front view illustrating an example of an application screen that includes another tool box according to the second exemplary embodiment.

FIG. 13 is a front view illustrating an example of an application screen 61 that includes another tool box 76 according to the second exemplary embodiment.

The application screen 61 illustrated in FIG. 13 displays the tool box 76 which is displayed in the case where the detected position and the content of the last operation indicate that "a position is designated after a size is designated in the upper and lower end areas" discussed above.

That is, in the case where a click operation is performed after a rectangular area K1 is designated by performing a drag operation in the upper end area EU, the tool box 76 which includes a plurality of tools used relatively frequently in the upper end area EU is displayed. The tool box 76 illustrated in FIG. 13 includes a plurality of types of stamps B4 to B6 (e.g. the stamp B4 for "IMP" meaning "important", the stamp B5 for "CIRC" meaning "for circulation", and the stamp B5 for "APVD" meaning "approved"), for example, as the plurality of tools. It is only necessary that the plurality of tools registered in the tool box 76 should include a tool for applying an inscription. Such tools are not limited to the stamps described above.

When the user selects a desired tool from among the plurality of tools included in the tool box 76, the selected tool is executed. For example, in the case where the stamp B5 is selected, a stamp "CIRC" is displayed in accordance with the size of the rectangular area K1.

Figure 14:
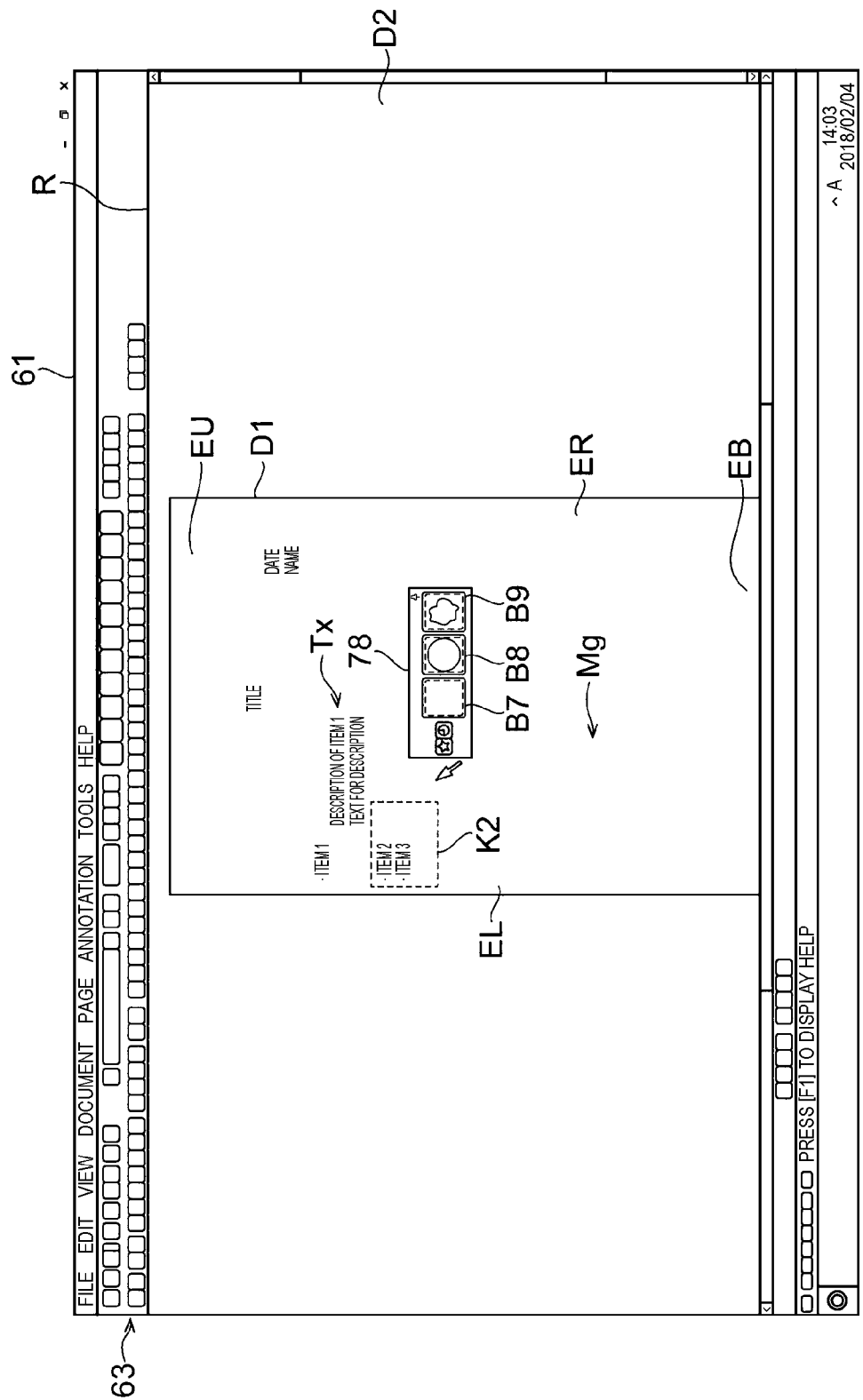
FIG. 14 is a front view illustrating an example of an application screen that includes still another tool box according to the second exemplary embodiment.

FIG. 14 is a front view illustrating an example of an application screen 61 that includes still another tool box 78 according to the second exemplary embodiment.

The application screen 61 illustrated in FIG. 14 displays the tool box 78 which is displayed in the case where the detected position and the content of the last operation indicate that "a position is designated after a size is designated in the character string portion" discussed above.

That is, in the case where a click operation is performed after a rectangular area K2 is designated by performing a drag operation in the character string portion Tx, the tool box 78 which includes a plurality of tools used relatively frequently in the character string portion Tx is displayed. The tool box 78 illustrated in FIG. 14 includes a plurality of types of figures B7 to B9 (e.g. the figure B7 in a rectangular shape, the figure B8 in a round shape, and the figure B9 in a cloud shape), for example, as the plurality of tools. It is only necessary that the plurality of tools registered in the tool box 78 should include a tool for emphasizing a character string. Such tools are not limited to the figures described above.

When the user selects a desired tool from among the plurality of tools included in the tool box 78, the selected tool is executed. For example, in the case where the figure B7 is selected, a rectangular frame is displayed in accordance with the size of the rectangular area K2.

Figure 15:
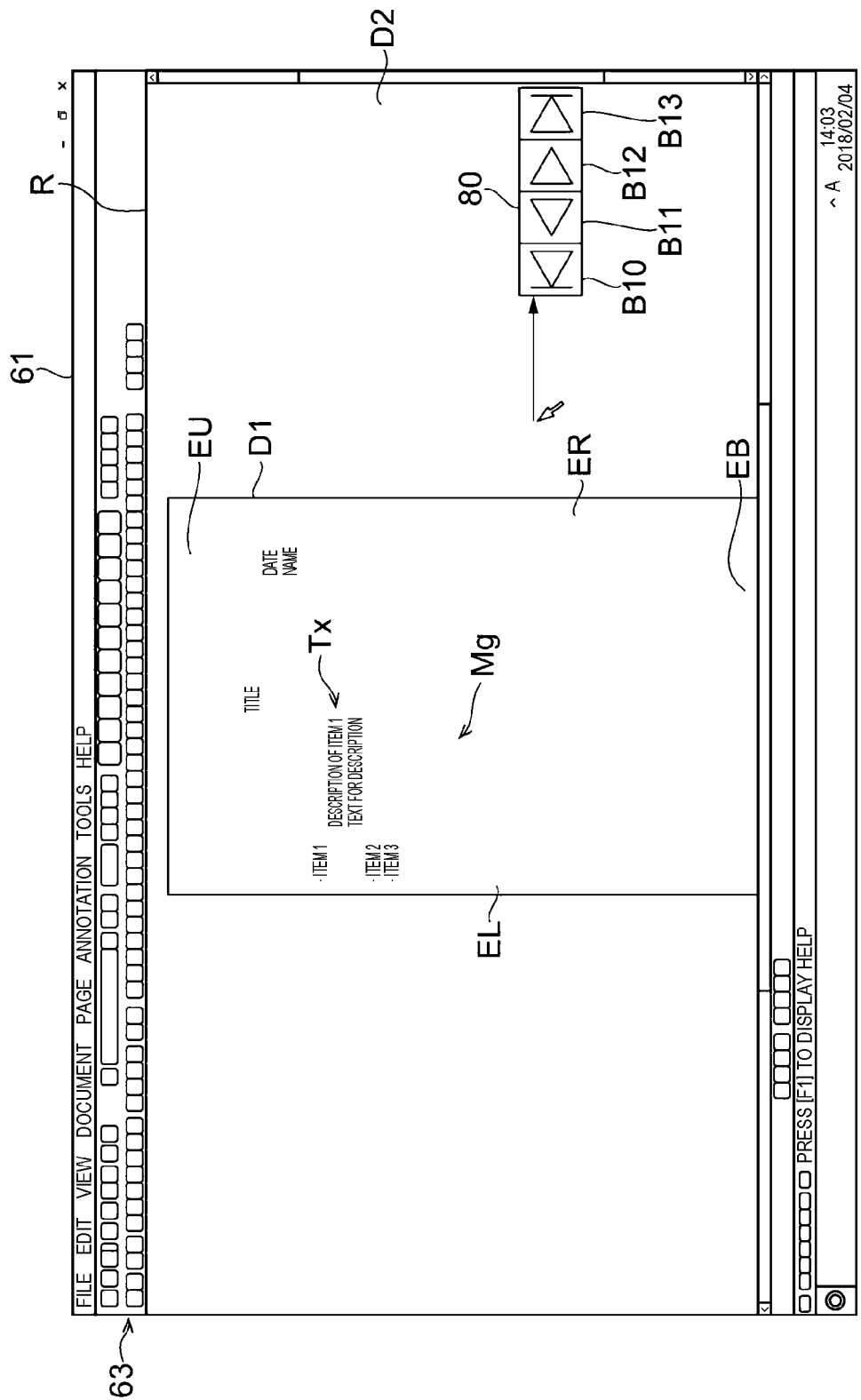
FIG. 15 is a front view illustrating an example of an application screen that includes still another tool box according to the second exemplary embodiment.

FIG. 15 is a front view illustrating an example of an application screen 61 that includes still another tool box 80 according to the second exemplary embodiment.

The application screen 61 illustrated in FIG. 15 displays the tool box 80 which is displayed in the case where the detected position and the content of the last operation indicate that "a position is designated after a drag operation in the background area" That is, in the case where a drag operation is performed in the right-left direction in the background area D2 for rightward or leftward scrolling, the tool box 80 which includes a plurality of tools related to page navigation is displayed. The tool box 80 illustrated in FIG. 15 includes a plurality of types of page navigations B10 to B13 in the right-left direction, for example, as the plurality of tools. The page navigation B10 represents moving to the first page. The page navigation B11 represents moving to the preceding page. The page navigation B12 represents moving to the following page. The page navigation B13 represents moving to the last page. It is only necessary that the plurality of tools registered in the tool box 80 should include a tool related to page navigation. Such tools are not limited to those for page navigation. For example, in the case where a drag operation is performed in the up-down direction in the background area D2 for upward or downward scrolling, the tool box 80 which includes a plurality of types of tools for page navigation in the up-down direction (such as ↑/↓ and +/−, for example) may be displayed.

When the user selects a desired tool from among the plurality of tools included in the tool box 80, the selected tool is executed. For example, in the case where the page navigation B12 is selected, the page being displayed is changed to the following page.

Thus, according to the present exemplary embodiment, the position in a display area at which a tool box is to be displayed and the content of the last operation are detected and the content of the tool box is varied in accordance with the detected position and the content of the last operation in the case where the tool box is to be displayed through an identical operation.

Third Exemplary Embodiment

In the present exemplary embodiment, a tool box is generated using an operation log during a period in which the user displays a tool box.

Figure 16:
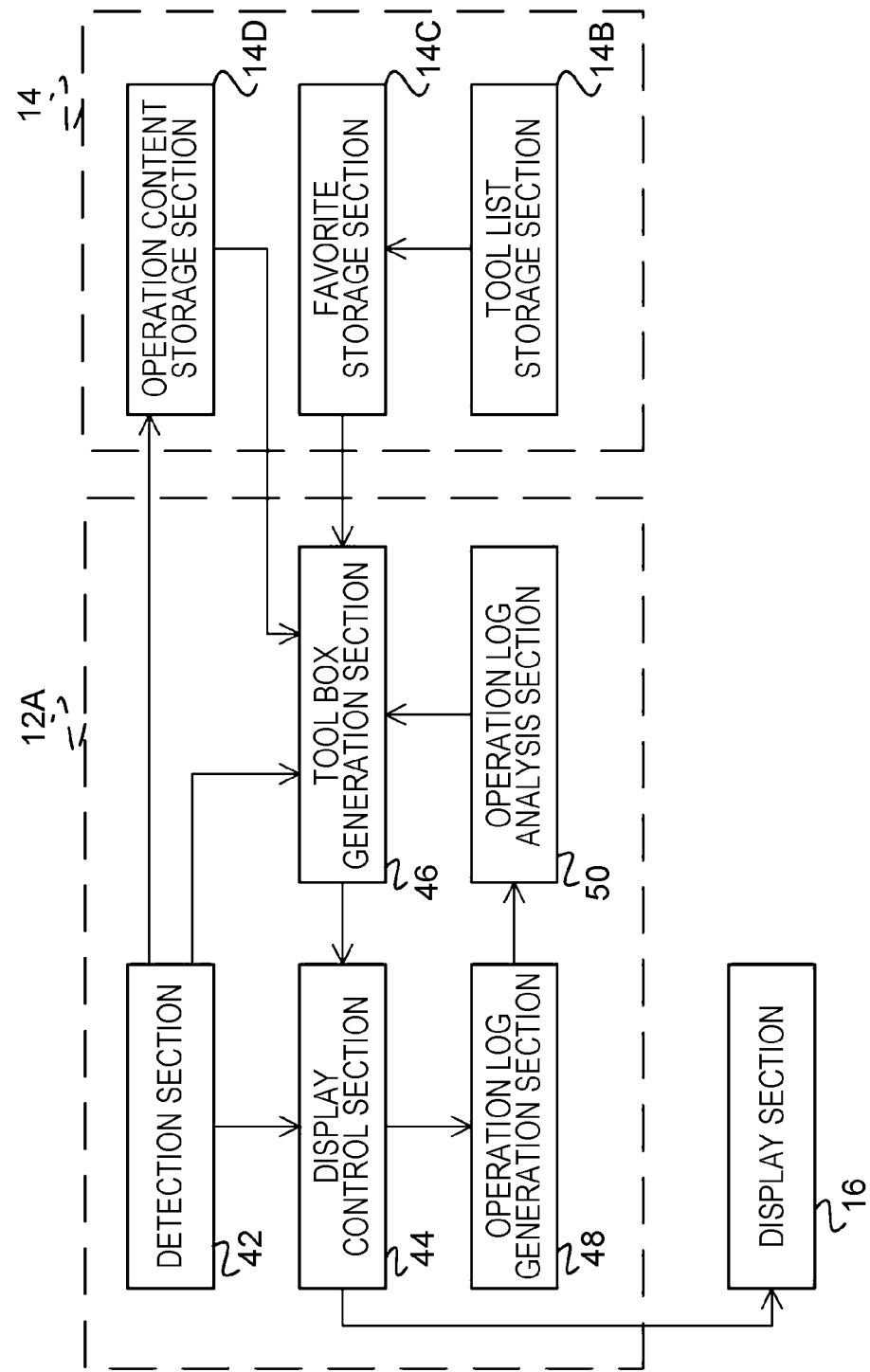
FIG. 16 is a block diagram illustrating an example of the functional configuration of an information processing apparatus according to a third exemplary embodiment.

FIG. 16 is a block diagram illustrating an example of the functional configuration of an information processing apparatus 10C according to a third exemplary embodiment.

Constituent elements that have substantially the same function as those of the information processing apparatus 10A according to the first exemplary embodiment described above are denoted by the same reference numeral to omit repeated description.

As illustrated in FIG. 16, the CPU 12A of the information processing apparatus 10C according to the present exemplary embodiment functions as a detection section 42, a display control section 44, a tool box generation section 46, an operation log generation section 48, and an operation log analysis section 50. The display control section 44 is an example of a first display control section, a second display control section, and a third display control section. The storage section 14 stores the tool list storage section 14B, the favorite storage section 14C, and the operation content storage section 14D.

The detection section 42 according to the present exemplary embodiment detects a position designated by the user in the display area R through a click operation, and further detects the content of the last operation performed by the user before the position is detected.

The operation log generation section 48 according to the present exemplary embodiment generates an operation log during a period in which the user performs an operation in the display area R. In the operation log, as illustrated in FIG. 18 to be discussed later, the position at which the user performs a click operation, the content of the last operation, and the tool which is used are correlated with each other, by way of example. In the case where a plurality of users edit the document D1 using an identical information processing apparatus, an operation log is generated for each of the users.

The operation log analysis section 50 according to the present exemplary embodiment analyzes the tendency of the user for a tool box on the basis of the operation log generated by the operation log generation section 48, and sends the analysis result to the tool box generation section 46.

In the case where a position is detected by the detection section 42, the tool box generation section 46 according to the present exemplary embodiment generates a tool box by extracting tools used relatively frequently at the detected position from the favorite storage section 14C or the tool list storage section 14B, by way of example, using the analysis result received from the operation log analysis section 50.

The display control section 44 according to the present exemplary embodiment performs control so as to display the tool box generated by the tool box generation section 46 on the display section 16.

Next, the function of the information processing apparatus 10C according to the third exemplary embodiment will be described with reference to FIGS. 17 to 19.

Figure 17:
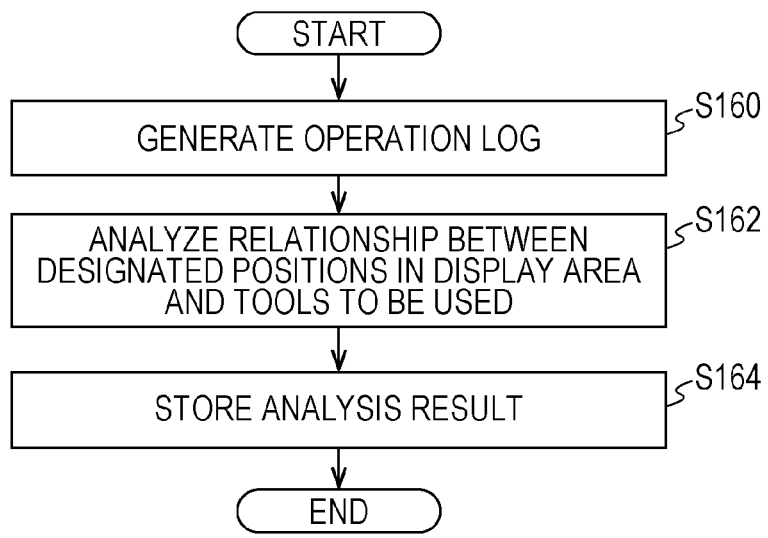
FIG. 17 is a flowchart illustrating an example of the flow of an operation log analysis process performed by a data editing program according to the third exemplary embodiment.

FIG. 17 is a flowchart illustrating an example of the flow of an operation log analysis process performed by the data editing program 14A according to the third exemplary embodiment.

The application screen 60 illustrated in FIG. 3 discussed above, by way of example, is displayed on the display section 16 of the information processing apparatus 10C in accordance with a predetermined operation by the user.

In step S160 in FIG. 17, the operation log generation section 48 generates the operation log illustrated in FIG. 8, by way of example, on the basis of the content of an operation performed by the user in the display area R on the application screen 60 illustrated in FIG. 3 discussed above.

FIG. 18 illustrates an example of an operation log according to the third exemplary embodiment.

In the operation log illustrated in FIG. 18, a click position (i.e. a position designated through a click operation by the user), a previous operation (i.e. the content of the last operation), and a tool used by the user are correlated with each of an operation 1 to an operation 7.

For the operation 1, the click position is stored as "end portion" of the document, the previous operation is stored as "none", and the tool used by the user is stored as "date mark" outside the tool box. For the operation 2, the click position is stored as "end portion" of the document, the previous operation is stored as "none", and the tool used by the user is stored as "blue sticky note" inside the tool box. For the operation 3, the click position is stored as "on a character string" of the document, the previous operation is stored as "a character string is selected", and the tool used by the user is stored as "marker" inside the tool box. For the operation 4, the click position is stored as "center" of the document, the previous operation is stored as "drag", and the tool used by the user is stored as "round" figure inside the tool box. For the operation 5, the click position is stored as "end portion" of the document, the previous operation is stored as "none", and the tool used by the user is stored as "green sticky note" inside the tool box. For the operation 6, the click position is stored as "end portion" of the document, the previous operation is stored as "none", and the tool used by the user is stored as "date mark" outside the tool box. For the operation 7, the click position is stored as "center" of the document, the previous operation is stored as "drag", and the tool used by the user is stored as "rectangular" figure inside the tool box.

Returning to FIG. 17, in step S162, the operation log analysis section 50 analyzes the relationship between the designated positions in the display area and the tools to be used using the operation log illustrated in FIG. 18, by way of example. For example, it is assumed that the tools stored in the favorite storage section 14C by the user include "blue sticky note, date mark, and marker".

Meanwhile, it is assumed that the tools that may be registered in the tool box when a click operation is performed at an end portion of a document include "blue sticky note, green sticky note, and sticky note".

It is seen from the operation log illustrated in FIG. 18 that the operation 1, the operation 2, the operation 5, and the operation 6 are operation logs for a click operation performed at an end portion. At this time, among the tools inside the tool box, the blue sticky note and the green sticky note are each used once. Among the tools outside the tool box, meanwhile, the date mark is used twice. The date mark is stored in the favorite storage section 14C, and it is estimated that the date mark is a tool used relatively frequently by the user. Among the tools that may be registered in the tool box "blue sticky note, green sticky note, and sticky note", on the other hand, the sticky note is not used, and it is estimated that the sticky note is used relatively less frequently by the user.

In the above case, the tools that may be registered in the tool box are updated to "blue sticky note, green sticky note, and date mark" by exchanging the sticky note and the date mark with each other. The update is performed when a certain number of operation logs are collected, or the frequency of updates is determined by designating the intervals of the updates etc.

In step S164, the operation log analysis section 50 stores "blue sticky note, green sticky note, and date mark" after the update in the storage section 14 as an example of the analysis result, and ends the sequence of processes.

Figure 19:
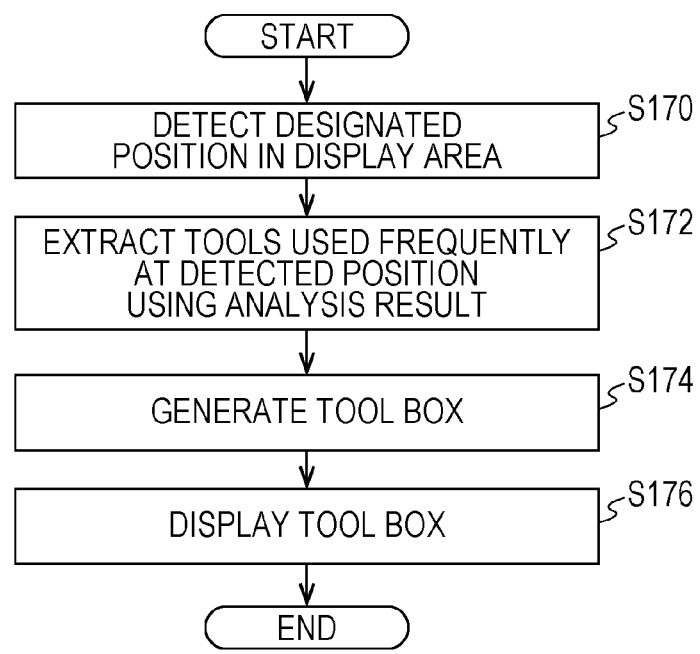
FIG. 19 is a flowchart illustrating an example of the flow of a tool box display process performed by the data editing program according to the third exemplary embodiment.

FIG. 19 is a flowchart illustrating an example of the flow of a tool box display process performed by the data editing program 14A according to the third exemplary embodiment.

The application screen 60 illustrated in FIG. 3 discussed above, by way of example, is displayed on the display section 16 of the information processing apparatus 10C in accordance with a predetermined operation by the user.

In step S170 in FIG. 19, the detection section 42 detects a designated position in the display area R on the application screen 60 illustrated in FIG. 3 discussed above. Specifically, as discussed above, the detection section 42 detects a position to which the user has moved a cursor using a device for operation input such as a mouse and at which the user has performed a click operation.

In step S172, the tool box generation section 46 extracts tools used frequently at the position detected in step S170 using the analysis result obtained in step S164 illustrated in FIG. 17. Here, by way of example, the tools "blue sticky note, green sticky note, and date mark" discussed above are extracted.

In step S174, the tool box generation section 46 generates a tool box that includes the tools extracted in step S172.

In step S176, the display control section 44 performs control so as to display the tool box generated in step S174 on the display section 16, and ends the sequence of processes.

Thus, according to the present exemplary embodiment, the tendency of tools used by the user is automatically analyzed in correlation with the position of a click operation.

The information processing apparatuses according to the exemplary embodiments have been described above. The exemplary embodiments may be implemented in the form of a program that causes a computer to execute the functions of the various sections of the information processing apparatuses. The exemplary embodiments may be implemented in the form of a computer-readable storage medium that stores such a program.

Besides, the configuration of the information processing apparatuses described in relation to the above exemplary embodiments is exemplary, and may be changed in accordance with the situation without departing from the scope and spirit of the present disclosure.

The flow of the process of the program described in relation to the above exemplary embodiments is also exemplary, and an unnecessary step may be removed, a new step may be added, or the process order may be changed without departing from the scope and spirit of the present disclosure.

In the exemplary embodiments described above, the process according to the exemplary embodiments is implemented by a software configuration using a computer by executing a program. However, the present disclosure is not limited thereto. For example, the process according to the exemplary embodiments may be implemented by a hardware configuration or a combination of a hardware configuration and a software configuration.

What is claimed is:

1. An information processing apparatus comprising a processor configured to:
   perform control so as to display a display area that includes data to be edited, wherein the data to be edited includes end areas provided at upper, lower, right, and left portions, and a body text area,
   wherein the end areas provided at the upper, lower, right, and left portions in the data to be edited are areas toward an inner side from different ends of the data to be edited, wherein the upper portion and the lower portion are in two opposite ends of the data to be edited, and the right portion and the lower portion are in two other opposite ends of the data to be edited, wherein the body text area is surrounded by the upper, lower, right, and left portions;
   detect a position designated by a user in the display area;
   perform in control so as to display a tool box, in which a plurality of tools are registered, through an identical operation; and
   perform control, in a case where the tool box is to be displayed, so as to display the tool box with a different content in accordance with the position at the upper, lower, right, and left portions of the end areas, and the body text area detected by the processor,
   wherein the processor is further configured to perform control
   so as to display a tool box that includes a tool for applying a first annotation correlated with the upper and lower portions of the end areas in the case where the position is in the upper and lower portions of the end areas, wherein the first annotation comprises an inscription that is applicable to the data to be edited, and
   so as to display a tool box that includes a tool for applying a second annotation correlated with the right and left end areas in the case where the position is in the right and left end areas, wherein the second annotation comprises a mark that is applicable to the data to be edited.

2. The information processing apparatus according to claim 1,
   wherein the display area includes only the data to be edited and a background of the data to be edited, and
   the processor is configured to perform control so as to display the content of the tool box differently between a case where the position is in an area of the data to be edited and a case where the position is in an area of the background.

3. The information processing apparatus according to claim 2,
   wherein the processor is configured to perform control
   so as to display a tool box for use to edit the data to be edited in the case where the position is in the area of the data to be edited, and
   so as to display a tool box for use other than to edit the data to be edited in the case where the position is in the area of the background.

4. The information processing apparatus according to claim 3,
   wherein the tool box for use other than to edit the data to be edited includes a tool related to an output mode of the data to be edited.

5. The information processing apparatus according to claim 1,
   wherein the inscription includes at least one of an approval mark, a date mark, and a stamp, and
   the mark includes a sticky note that enables input of a comment.

6. The information processing apparatus according to claim 1,
   wherein the data to be edited includes a body text area that includes a character string portion that includes a plurality of character strings and a margin portion that excludes the character string portion, and
   the processor is configured to perform control so as to display the content of the tool box differently between a case where the position is in the character string portion and a case where the position is in the margin portion.

7. The information processing apparatus according to claim 6,
   wherein the processor is configured to perform control so as to display a tool box that includes a tool for inserting at least one of a figure and an image determined in advance in the case where the position is in the margin portion.

8. The information processing apparatus according to claim 1,
   wherein the processor is further configured to detect a content of a last operation performed by the user before the position is detected, and
   the processor is configured to perform control so as to display the content of the tool box differently in accordance with the position and the content of the last operation.

9. The information processing apparatus according to claim 8,
   wherein the data to be edited includes the end areas provided at the upper, lower, right, and left portions, and
   in a case where the position is in the upper and lower portions of the end areas and the content of the last operation is an operation to designate a size, the processor is configured to perform control
   so as to display a tool box that includes a tool for applying an annotation correlated with the upper and lower portions of the end areas, and
   so as to display the annotation in accordance with the size in a case where the tool is selected.

10. The information processing apparatus according to claim 9,
    wherein the annotation is an inscription that is applicable to the data to be edited.

11. A non-transitory computer readable medium storing a program causing a computer to execute a process, the process comprising:

performing first display control so as to display a display area that includes data to be edited, wherein the data to be edited includes end areas provided at upper, lower, right, and left portions, and a body text area, wherein the end areas provided at the upper, lower, right, and left portions in the data to be edited are areas toward an inner side from different ends of the data to be edited, wherein the upper portion and the lower portion are in two opposite ends of the data to be edited, and the right portion and the lower portion are in two other opposite ends of the data to be edited, wherein the body text area is surrounded by the upper, lower, right, and left portions;

detecting a position designated by a user in the display area;

performing second display control so as to display a tool box, in which a plurality of tools are registered, through an identical operation; and performing third display control, in a case where the tool box is to be displayed, so as to display the tool box with a different content in accordance with the position at the upper, lower, right, and left portions of the end areas and the body text area detected by the detecting, performing fourth control so as to display a tool box that includes a tool for applying a first annotation correlated with the upper and lower portions of the end areas in the case where the position is in the upper and lower portions of the end areas, wherein the first annotation comprises an inscription that is applicable to the data to be edited, and display a tool box that includes a tool for applying a second annotation correlated with the right and left end areas in the case where the position is in the right and left end areas, wherein the second annotation comprises a mark that is applicable to the data to be edited.

12. An information processing apparatus comprising:

first display control means for performing control so as to display a display area that includes data to be edited, wherein the data to be edited includes end areas provided at upper, lower, right, and left portions, and a body text area, wherein the end areas provided at the upper, lower, right, and left portions in the data to be edited are areas toward an inner side from different ends of the data to be edited, wherein the upper portion and the lower portion are in two opposite ends of the data to be edited, and the right portion and the lower portion are in two other opposite ends of the data to be edited, wherein the body text area is surrounded by the upper, lower, right, and left portions;

detection means for detecting a position designated by a user in the display area;

second display control means for performing control so as to display a tool box, in which a plurality of tools are registered, through an identical operation;

third display control means for performing control, in a case where the tool box is to be displayed, so as to display the tool box with a different content in accordance with the position at the upper, lower, right, and left portions of the end areas and the body text area detected by the detection means; and fourth display control means for performing control so as to display a tool box that includes a tool for applying a first annotation correlated with the upper and lower portions of the end areas in the case where the position is in the upper and lower portions of the end areas wherein the first annotation comprises an inscription that is applicable to the data to be edited, and display a tool box that includes a tool for applying a second annotation correlated with the right and left end areas in the case where the position is in the right and left end areas, wherein the second annotation comprises a mark that is applicable to the data to be edited.

\* \* \* \* \*